United States Patent
Idehara

(10) Patent No.: US 9,992,372 B2
(45) Date of Patent: Jun. 5, 2018

(54) IMAGE PROCESSING DEVICE, COMPUTER PROGRAM PRODUCT FOR CONTROLLING IMAGE PROCESSING DEVICE AND IMAGE PROCESSING SYSTEM

(71) Applicant: Konica Minolta, Inc., Chiyoda-ku, Tokyo (JP)

(72) Inventor: Takenori Idehara, Sagamihara (JP)

(73) Assignee: Konica Minolta, Inc., Chiyoda-ku, Tokyo (JP)

( * ) Notice: Subject to any disclaimer, the term of this patent is extended or adjusted under 35 U.S.C. 154(b) by 0 days. days.

(21) Appl. No.: 14/947,975

(22) Filed: Nov. 20, 2015

(65) Prior Publication Data

US 2016/0150121 A1   May 26, 2016

(30) Foreign Application Priority Data

Nov. 25, 2014   (JP) .................................. 2014-238125

(51) Int. Cl.
| | |
|---|---|
| G06F 1/32 | (2006.01) |
| H04N 1/00 | (2006.01) |
| H04N 1/32 | (2006.01) |
| G06K 15/02 | (2006.01) |

(Continued)

(52) U.S. Cl.
CPC ....... H04N 1/32101 (2013.01); G06F 1/3231 (2013.01); G06K 9/00369 (2013.01); H04N 1/00411 (2013.01); *G09G 2354/00* (2013.01); *G09G 2370/042* (2013.01); *H04N 2201/0094* (2013.01); *Y02D 10/173* (2018.01)

(58) Field of Classification Search
None
See application file for complete search history.

(56) References Cited

U.S. PATENT DOCUMENTS

2004/0192206 A1* 9/2004 Hirvonen ............ H04W 48/18
  455/41.2
2005/0270569 A1* 12/2005 Hayashi ............ H04N 1/00204
  358/1.15

(Continued)

FOREIGN PATENT DOCUMENTS

| CN | 102314326 A | 1/2012 |
| CN | 103856657 A | 6/2014 |

(Continued)

OTHER PUBLICATIONS

European Search Report for EP Application No. 15195049.0, dated Apr. 20, 2016, 9 pp.

(Continued)

*Primary Examiner* — Beniyam Menberu
(74) *Attorney, Agent, or Firm* — Squire Patton Boggs (US) LLP

(57) ABSTRACT

An image processing device is provided that allows a user to readily know identification information of the image processing device without performing any particular operation on the image processing device. Each of image processing devices includes a motion sensor which detects a person, a display unit, and a control unit which causes the display unit to display identification information for distinguishing the image processing device from other image processing devices in response to detection of the person by the motion sensor.

20 Claims, 19 Drawing Sheets

(51) Int. Cl.
   *G06F 3/12*      (2006.01)
   *G06K 9/00*      (2006.01)

(56) References Cited

U.S. PATENT DOCUMENTS

| | | | | |
|---|---|---|---|---|
| 2009/0315869 A1* | 12/2009 | Sugihara | ............... | G06F 1/1605 345/204 |
| 2010/0073169 A1* | 3/2010 | Needham | ............... | A61J 7/0481 340/573.1 |
| 2011/0317211 A1 | 12/2011 | Yamada et al. | | |
| 2013/0335758 A1* | 12/2013 | Torii | ............... | G06F 3/1294 358/1.9 |
| 2014/0036305 A1 | 2/2014 | Nakamura | | |
| 2014/0062675 A1* | 3/2014 | Murata | ............... | G08C 17/02 340/12.5 |
| 2014/0092417 A1 | 4/2014 | Kuroishi et al. | | |
| 2014/0153031 A1 | 6/2014 | Toyamasaki | | |
| 2014/0173315 A1 | 6/2014 | Yokoyama | | |
| 2014/0368029 A1* | 12/2014 | Park | ............... | H03K 17/945 307/9.1 |
| 2015/0002768 A1* | 1/2015 | Wu | ............... | G02F 1/13306 349/16 |
| 2015/0256540 A1* | 9/2015 | Cheon | ............... | G06F 1/3231 726/5 |

FOREIGN PATENT DOCUMENTS

| | | | | |
|---|---|---|---|---|
| EP | 1 619 657 A2 | | 1/2006 | |
| JP | 2007-013888 | * | 1/2007 | ............... H04N 1/32 |
| JP | 2012-079194 | * | 4/2012 | ............... G06F 3/14 |
| JP | A-2014-32626 | | 2/2014 | |

OTHER PUBLICATIONS

Office Action dated Jan. 4, 2018, in Chinese Patent Application No. 201510828985.1, 19 pages.

* cited by examiner

IMAGE PROCESSING DEVICE, COMPUTER PROGRAM PRODUCT FOR CONTROLLING IMAGE PROCESSING DEVICE AND IMAGE PROCESSING SYSTEM

CROSS-REFERENCE TO RELATED APPLICATION

This application is based on Japanese Patent Application No. 2014-238125 filed on Nov. 25, 2014, the contents of which are incorporated herein by reference.

BACKGROUND

1. Field of the Invention

The present invention relates to an image processing device, a computer program product for controlling an image processing device, and an image processing system.

2. Description of Related Art

Environments in which multiple computers (for example, personal computers) and multiple image processing devices are connected to a network are in widespread use nowadays.

When a user uses an image forming device from a personal computer or the like that is connected to a network in an environment where multiple image forming devices, which are a type of image processing device, are connected to the network, the user needs to specify one of the multiple image forming devices to use. Identification information such as an IP (Internet Protocol) address and a unique name is assigned to each image forming device for identifying the image forming device.

Accordingly, when the user uses an image forming device from a personal computer or the like, the user uses the identification information to specify the image forming device to use and performs printing or the like. If the user does not know the identification information of the image forming device which the user wants to use, the user has to know the identification information. However, to know such identification information, the user has to perform some operation. There has been therefore a problem that if the user does not know how to perform the operation, the user may not know the identification information, and may not specify the desired image forming device.

A related art to solve the problem is to display an image forming device on a personal computer in a readily identifiable manner in response to a particular operation on the image forming device. See Japanese Patent Publication No. 2014-32626. In this art, an operation for accepting a specification of printing or the like is performed from an operation panel of an image forming device. Then, when the image forming device is searched by multicast from a personal computer, the operated image forming device provides a response with additional information such as renaming the device. According to the response from the operated image forming device, a display is presented on the personal computer that has multicast in accordance with the additional information. As a result, the desired image forming device can be readily identified by the additional information.

However, the related art requires a particular operation on the image forming device. Therefore, the fundamental problem that the user may not know identification information if the user does not know how to perform the operation remains unsolved.

In addition, a new problem arises that when a user other than the user who performed the particular operation uses the image forming device, if the image forming device has been renamed, the other user may not determine whether the renamed device is the same as the device which the other user wants to use and may not select the correct image forming device. The user who performed the particular operation can readily identify the image forming device immediately after the particular operation but, if the device name was changed back to the original name, the user may not identify the image forming device again when the user attempt to use the image forming device at a later date.

SUMMARY

Therefore, an object of the present invention is to provide an image processing device that allows a user to readily know identification information for identifying an image processing device without performing any particular operation on the image processing device. Another object is to provide a computer program product for controlling an image processing device that allows a user to readily know identification information for identifying an image processing device without performing any particular operation on the image processing device. Yet another object is to provide an image processing system that allows a user to readily know identification information for identifying an image processing device without performing any particular operation on the image processing device.

To achieve at least one of the abovementioned objects, an image processing device reflecting one aspect of the present invention is an image processing device which performs image processing in response to a specifying operation by a user and includes: a motion sensor which detects a person; a display unit which displays information on a screen; and a control unit which causes the display unit to display a screen including identification information used for the specifying operation by the user and for distinguishing the image processing device from other image processing devices in response to detection of the person by the motion sensor.

The image processing device preferably further includes an operation panel which accepts an operation. In the image processing device, preferably the control unit changes display from the screen including the identification information displayed on the display unit to an operation screen in response to an operation on the operation panel and blanks the screen including the identification information displayed on the display unit in response to the motion sensor no longer detecting the person.

In the image processing device, preferably the control unit compares the identification information of own image processing device with identification information of the other image processing devices to extract a different portion of the identification information of the own image processing device, and causes the identification information to be displayed with the extracted different portion being highlighted.

The image processing device preferably includes a storage unit. In the image processing device, preferably the control unit stores information indicating that the image processing device has displayed the identification information in the storage unit and, when an image processing device search is made from a terminal device within a first predetermined time, sends the information indicating that the image processing device has displayed the identification information stored in the storage unit back to the terminal device.

The image processing device preferably includes a storage unit. In the image processing device, preferably the control unit stores information indicating that the image processing device has displayed the identification information in the storage unit and, when an image processing device search is made from a terminal device within a second predetermined time after the motion sensor no longer detects the person, sends the information indicating that the image processing device has displayed the identification information stored in the storage unit back to the terminal device.

In the image processing device, when duration of time the motion sensor is detecting the person is less than a third predetermined time, the control unit preferably does not send the information indicating that the image processing device has displayed the identification information back to the terminal device.

In the image processing device, when the search is made from the terminal device within a fourth predetermined time after the motion sensor no longer detects the person, the control unit preferably does not send the information indicating that the image processing device has displayed the identification information back to the terminal device.

The image processing device preferably includes a storage unit. In the image processing device, preferably the control unit stores time at which the image processing device has displayed the identification information in the storage unit and, when an image processing device search is made from a terminal device within a first predetermined time, sends the time at which the image processing device has displayed the identification information stored in the storage unit back to the terminal device.

In the image processing device, when duration of time the motion sensor is detecting the person is less than a third predetermined time, the control unit preferably does not send the time at which the image processing device has displayed the identification information back to the terminal device.

In the image processing device, when the search is made from the terminal device within a fourth predetermined time after the motion sensor no longer detects the person, the control unit preferably does not send the time at which the image processing device has displayed the identification information back to the terminal device.

The image processing device preferably includes a storage unit. In the image processing device, preferably the control unit stores time at which the motion sensor no longer detected the person in the storage unit and, when an image processing device search is made from a terminal device within a second predetermined time, sends the time at which the motion sensor no longer detected the person stored in the storage unit back to the terminal device.

In the image processing device, when duration of time the motion sensor is detecting the person is less than a third predetermined time, the control unit preferably does not send the time at which the motion sensor no longer detected the person back to the terminal device.

In the image processing device, when the search is made from the terminal device within a fourth predetermined time after the motion sensor no longer detects the person, the control unit preferably does not send the time at which the motion sensor no longer detected the person back to the terminal device.

In the image processing device, preferably, the larger a display device provided in the display unit is, the longer a distance at which the motion sensor detects the person is set to.

In the image processing device, when a large amount of the identification information is displayed, the control unit preferably sets a short distance at which the motion sensor detects the person, and when a small amount of the identification information is displayed, the control unit preferably sets a long distance at which the motion sensor detects the person.

In the image processing device, when the motion sensor detects the person at a short distance, the control unit preferably displays a large amount of the identification information, and when the motion sensor detects the person at a long distance, the control unit preferably displays a small amount of the identification information.

The objects, features, and characteristics of the present invention other than those set forth above will become apparent from the description given herein below with reference to preferred embodiments illustrated in the accompanying drawings.

DETAILED DESCRIPTION

Figure 1:
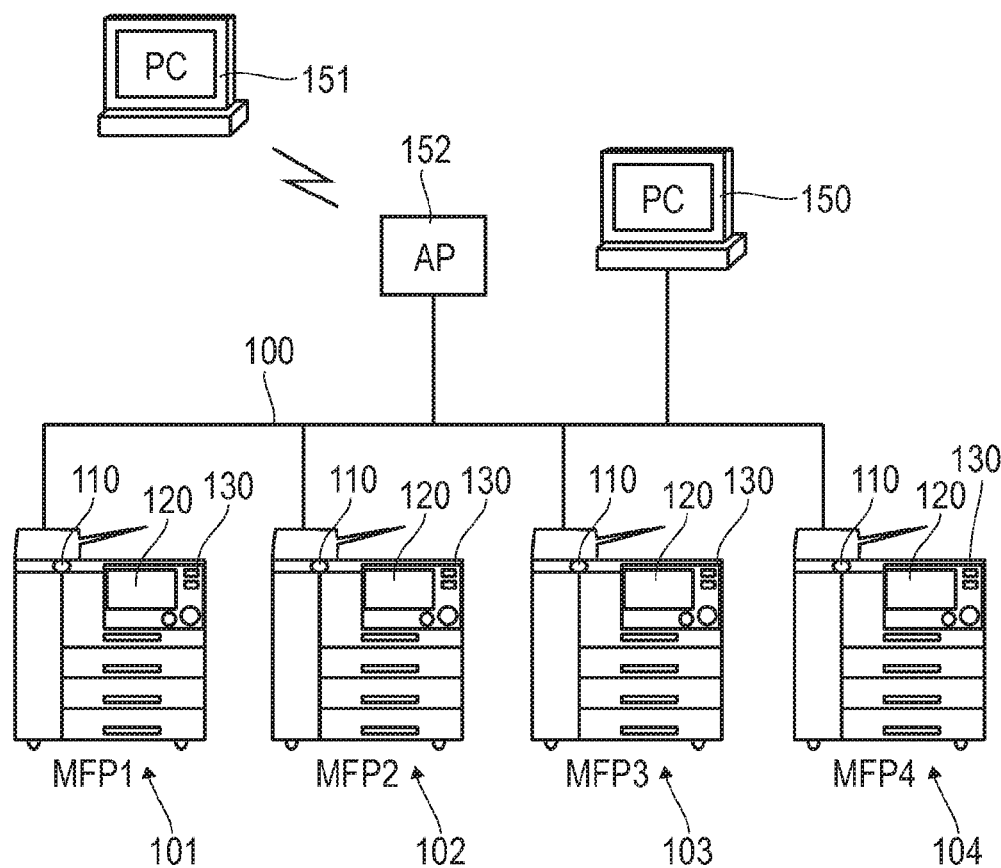
FIG. 1 is a block diagram illustrating an example of a system for image forming according to a first embodiment.

Embodiments of the present invention will be described below with reference to drawings. Elements that have the same functions are given the same reference numerals throughout the drawings and repeated description thereof will be omitted. Since the drawings are for the purpose of merely illustrating embodiments of the present invention, the dimensions and ratios of components are exaggerated or simplified for convenience of description and the dimensions and ratios are not to scale.

First Embodiment

A first embodiment displays identification information of an image processing device in response to detection of approach of a person to the image processing device. The identification information of the image processing device is used for distinguishing the image processing device from other image processing devices. The identification information is used for specifying operation by a user when the user uses the image processing device. The identification information may be an IP address, a number unique to the device, a unique name or the like, for example, and are assigned to each of a plurality of image processing devices.

Figure 2:
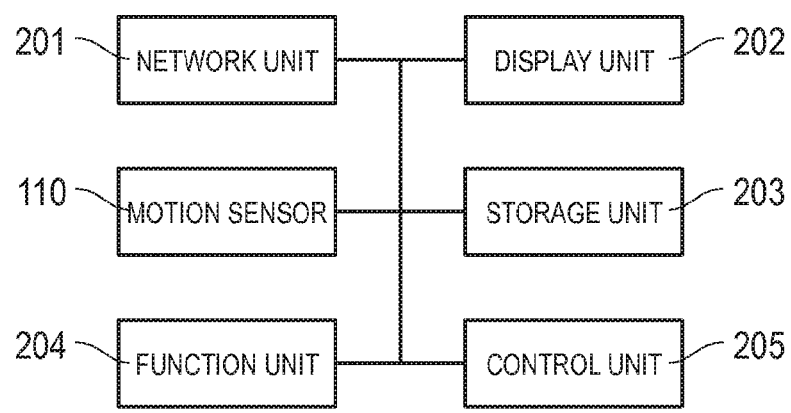
FIG. 2 is a block diagram illustrating functions of components of an image processing device.
Figure 3:
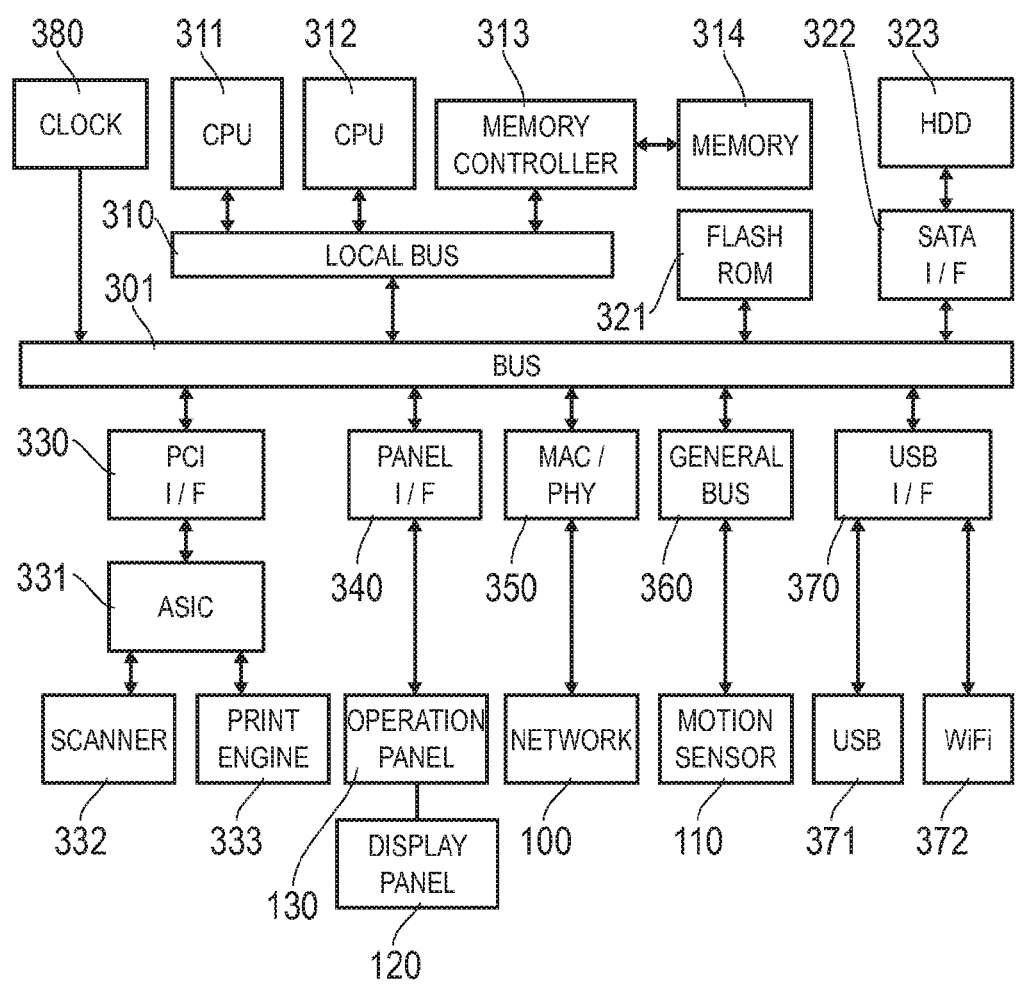
FIG. 3 is a block diagram illustrating a hardware configuration of an image processing device.

FIG. 1 is a block diagram illustrating an example of a system for image forming according to the first embodiment. FIG. 2 is a block diagram illustrating functions of components of an image processing device. FIG. 3 is a block diagram illustrating a hardware configuration of an image processing device.

In this system, a plurality of image processing devices 101 to 104 are connected through a network 100. Unique names, MFP1, MFP2, MFP3 and MFP4 are assigned to the image processing devices 101 to 104. The image processing devices 101 to 104 herein have the same configuration, each includes a motion sensor 110, an operation panel 130 equipped with a display panel 120, and the like. Each of the image processing devices includes a scanner, a print engine and other components.

Computers (hereinafter referred to as PCs (Personal Computers) 150, 151 are connected to the network 100. The PC 150 is connected through a cable, for example. The PC 151 is wirelessly connected through an access point 152, for example.

The PCs 150 and 151 are terminal devices operated by a user to select and use one of a plurality of image processing devices. For example, when printing is performed from the PC 150, a user specifies an image processing device on the PC 150. The same applies to printing from the PC 151.

Referring to FIG. 2, functions of an image processing device will be described. One image processing device 101 will be described here by way of example. The other image processing devices 102 to 104 have the same configuration.

The image processing device 101 includes a network unit 201, a display unit 202, a motion sensor 110, a storage unit 203, a function unit 204, and a control unit 205.

The network unit 201 connects the image processing device 101 to the network 100. This allows the image processing device 101 to communicate with an external device, for example the PC 150, through the network 100.

The display unit 202 includes an operation panel 130 which accepts operations. The operation panel 130 includes a display panel 120 which is a display device. The display unit 202 displays various kinds of information such as identification information and an operation screen on the display panel 120. The display panel 120 may be a liquid-crystal display device, an organic EL display device or the like, for example. The display panel 120 is a touch panel which is designed to be touched in reaction to a displayed screen to input various kinds of operations by a person (user). The operation panel 130 also includes input buttons (hardware keys) and the like such as a start button and a stop button.

The motion sensor 110 detects approach of a person to the image processing device 101. There are various types of sensors that can be used as the motion sensor 110, such as a pyroelectric sensor, which senses the temperature of a human, an active sensor, which uses reflections of ultrasonic waves or infrared, a sensor capable of identifying a person from an image captured by a camera or measuring the distance to a person, or the like. The motion sensor 110 may be of any type and is not limited to a specific type in this embodiment.

The storage unit 203 stores various programs which are procedures for implementing functions of the image processing device 101. The storage unit 203 stores identification information, such as an IP address, a number unique to the device, and a unique name. The storage unit 203 is also used for storing data which is received from the PC 150 and the like, and rasterized data during image forming, and for storing image data during copying by the image processing device 101.

The function unit 204 executes functions of the image processing device such as an image scan function, a copy function and a print function.

The control unit 205 controls functions as the image processing device 110, such as copying, printing and the like. The control unit 205 also controls for displaying a screen including identification information in response to detection of a person by the motion sensor 110 in this embodiment.

A hardware configuration of the image processing device will be described with reference to FIG. 3.

In the image processing device 101, CPUs (Central Processing Units) 311 and 312 are connected to a bus 301 through a local bus 310. A memory 314 is connected to the local bus 310 through a memory controller 313. These components make up the control unit 205. A RAM (Random Access Memory) is used as the memory 314. The memory 314 also serves as the storage unit 203. The control unit 205 (including the storage unit 203) has a configuration as what is called a computer. Accordingly, the CPUs execute predetermined programs to implement predetermined functions. The control unit 205 controls functions as the image processing device 101, such as printing, copying and the like. The control unit 205 also executes a program for performing a procedure for displaying identification information in response to detection of a person in this embodiment. Note that while an example using a multi CPU configuration (including the two CPUs 311 and 312) is given herein, a single CPU or three or more CPUs may be provided.

A flash ROM (Read Only Memory) 321, and a HDD (Hard Disk Drive) 323 through a SATA (Serial Advanced Technology Attachment) interface 322 are connected to the bus 301. The flash ROM 321 and the HDD 323 make up the storage unit 203. Note that interfaces at the components are abbreviated as I/F in the drawing.

A scanner 332 and a print engine 333 are also connected to the bus 301 through a PCI (Peripheral Components Interconnect bus) Interface 330 and an ASIC (Application Specific Integrated Circuit) 331. The scanner 332 is an image reading unit and the print engine 333 is an image forming unit. Note that the units are collectively called as the function unit 204.

The operation panel 130 equipped with the display panel 120 is connected to the bus 301 through a panel interface 340. These make up the display unit 202.

A MAC/Phy (Media Access Controller/Physical) layer 350 is also connected to the bus 301. The image processing device 101 is connected to the network 100 through the MAC/Phy layer 350. The MAC/Phy layer 350 makes up the network unit 201.

The motion sensor 110 is also connected to the bus 301 through a general bus 360. A USB device 371, a Wifi device 372 and the like can also be connected to the bus 301 through a USB interface 370 in order to connect with an external device.

A clock signal is input into the bus 301 from a clock 380. The CPUs 311 and 312 use the clock signal to measure time (a timer function). The CPUs 311 and 312 also keep track of time of day using the clock signal.

Figure 4:
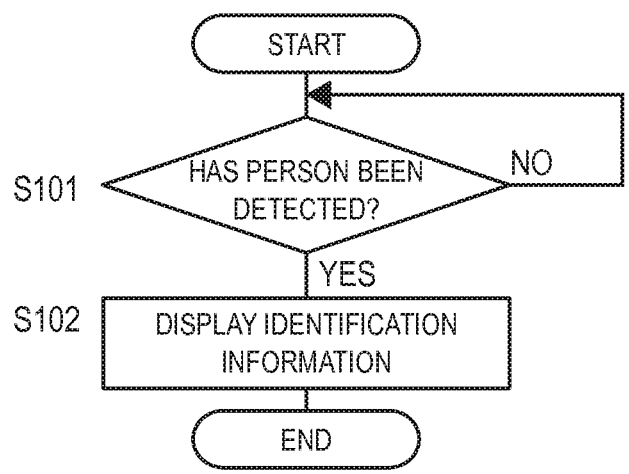
FIG. 4 is a flowchart illustrating a procedure according to a first embodiment.

A procedure by which the image processing device 101 configured as described above performs an operation according to the first embodiment will be described. FIG. 4 is a flowchart illustrating a procedure according to the first embodiment. The operation of the first embodiment is implemented by the control unit 205 executing a program written in accordance with the procedure.

First, the control unit 205 determines whether or not the motion sensor 110 has detected a person (S101). When the motion sensor 110 has not detected a person (S101: NO), the control unit 205 waits in a standby state. On the other hand, when the motion sensor 110 has detected a person (S101: YES), the control unit 205 retrieves identification information from the storage unit 203, sends the identification information to the display unit 202 to cause the display unit 202 to display the identification information (S102). This causes the display unit 202 to display a screen including the identification information on the display panel 120. The display unit 202 may display all pieces of identification information that can be displayed as the identification information. Alternatively, the display unit 202 may display only predetermined one or some pieces of identification information.

Figure 5:
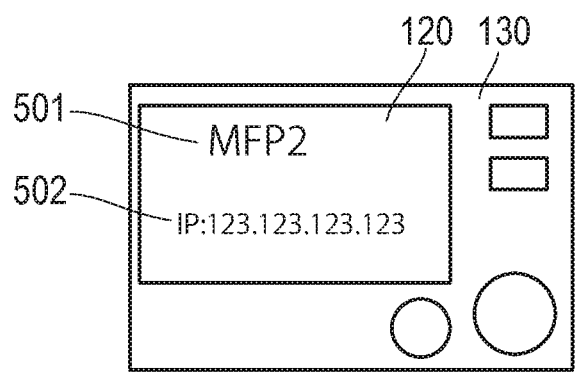
FIG. 5 is a diagram illustrating an exemplary display on a display panel according to the first embodiment.

FIG. 5 is a diagram illustrating an exemplary display on the display panel according to the first embodiment. The exemplary display illustrated in FIG. 5 is displayed when the image processing device 102 has executed the procedure described above.

As illustrated, an IP address 502 (the illustrated address is an imaginary address; the same applies to addresses illustrated later) which is assigned to the image processing device 102 is displayed on the display panel 120 along with a unique name 501, "MFP2", of the image processing device 102.

In this way, in the first embodiment, identification information for distinguishing the image processing device from other image processing devices is displayed on the display panel in response to detection of approach of a person (for example, a user who uses the image processing device) to the image processing device by the motion sensor. Accordingly, the user can know the identification information of the image processing device without performing any particular operation (naturally, without having to know how to perform any particular operation). Since this allows the user to know the identification information of the image processing device on which the user wants to print, the user returns to his/her PC and can specify the image processing device among a plurality of image processing devices.

Second Embodiment

A second embodiment displays identification information of an image processing device in response to detection of approach of a person to the image processing device. Then, when some operation has been performed by a user, an operation screen is displayed.

In the second embodiment, the network configuration, and the functional configuration and the hardware configuration of image processing devices are the same as those in the first embodiment and the description thereof will be omitted. A procedure for performing an operation according to the second embodiment will be described. The operation according to the second embodiment is implemented by the control unit 205 executing a program written in accordance with the following procedure.

Figure 6:
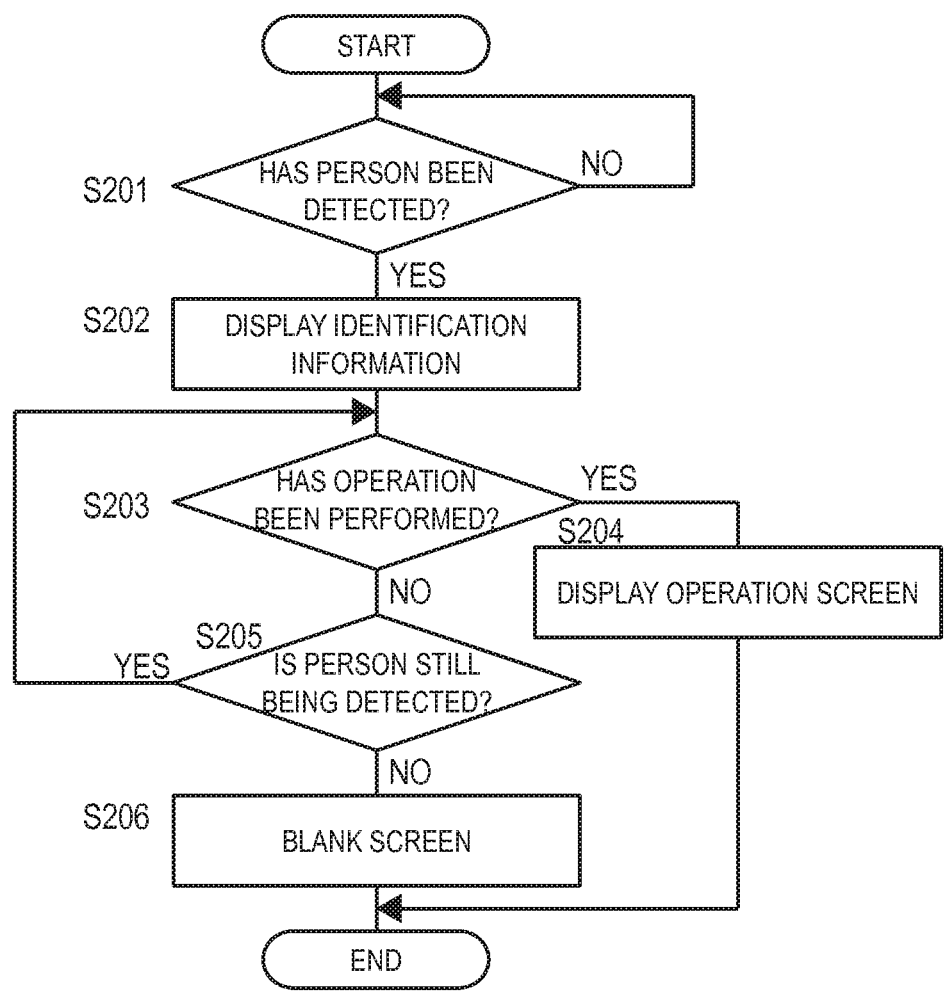
FIG. 6 is a flowchart illustrating a procedure according to a second embodiment.

FIG. 6 is a flowchart illustrating a procedure according to the second embodiment.

First, the control unit 205 determines whether or not the motion sensor 110 has detected a person (S201). When the motion sensor 110 has not detected a person (S201: NO), the control unit 205 waits in a standby state. On the other hand, when the motion sensor 110 has detected a person (S201: YES), the control unit 205 retrieves identification information from the storage unit 203, sends the identification information to the display unit 202 to cause the display unit 202 to display the identification information (S202). This causes the display unit 202 to display a screen including the identification information on the display panel 120. The display unit 202 may display all pieces of identification information that can be displayed as the identification information. Alternatively, the display unit 202 may display only predetermined one or some pieces of identification information.

The control unit 205 then determines whether or not some operation has been performed on an operation panel 130 (S203). When some operation has been performed (S203: YES), the control unit 205 changes display from the screen including the identification information displayed on the display unit 202 to an operation screen and causes the display unit 202 to display the operation screen (S204). After the operation screen is displayed, the control unit 205 ends the process.

At S204, the display unit 202 displays the operation screen on the display panel 120. The operation screen herein is, for example, a menu screen for selecting a function that can be executed on the image processing device 101. Alternatively, for example, when a screen is changed in order to display identification information, the operation screen that was displayed before the change is stored and the operation screen before the change may be displayed at S204. Note that if the image processing device 101 was in a power saving mode when the motion sensor 110 has detected a person, the display unit 202 may display the operation screen displayed before the image processing device 101 entered the power saving mode at S204.

On the other hand, when no operation has been performed (S203: NO), the control unit 205 then determines whether or not the motion sensor 110 is still detecting the person (S205). If the motion sensor 110 is still detecting the person (S205: YES), the control unit 205 returns to S203. This allows the identification information to continue to be displayed.

On the other hand, at S205, If the motion sensor 110 no longer detects the person (S205: NO), the control unit 205 causes the screen including the identification information to be blanked (S206). At this point in time, the image processing device 101 may enter the power saving mode and the display on the display panel 120 may be blanked. Then, the control unit 205 ends the process.

Figure 7A:
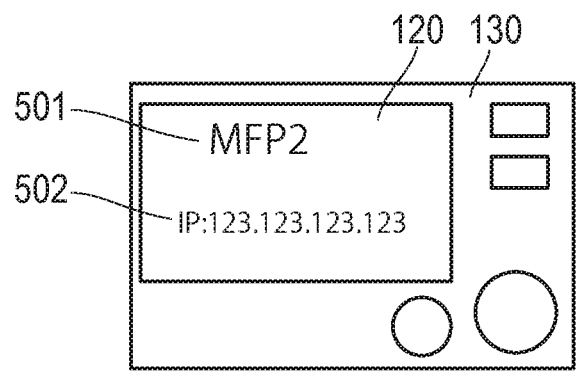
FIG. 7A is a diagram illustrating an exemplary display on a display panel according to the second embodiment.
Figure 7B:
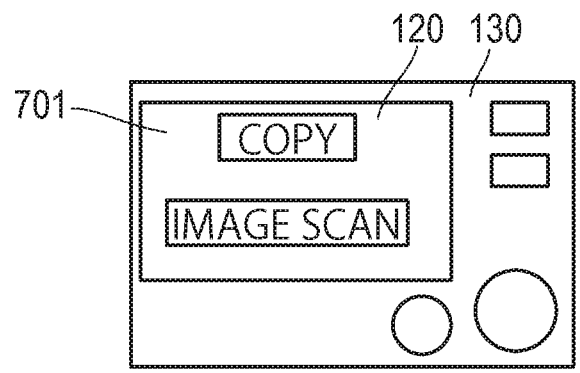
FIG. 7B is a diagram illustrating an exemplary display on a display panel according to the second embodiment.

FIGS. 7A and 7B are diagrams illustrating exemplary displays on the display panel according to the second embodiment. First, when the motion sensor 110 has detected a person, the unique name 501 and IP address 502 of the image processing device 101 are displayed as illustrated in FIG. 7A. This is the same as in the first embodiment. When the person performs an operation, an operation screen 701 is displayed as illustrated in FIG. 7B. In this example, a menu screen for selecting one of copy and image scan is displayed.

In this way, in the second embodiment, identification information for distinguishing the image processing device from other image processing devices is displayed on the display panel in response to detection of approach of a person to the image processing device by the motion sensor. Accordingly, the user can know the identification information of the image processing device without performing any particular operation or without having to know how to perform any particular operation. Since this allows the user to know the identification information of the image processing device on which the user wants to print, the user returns to his/her PC and can specify the image processing device among a plurality of image processing devices. In addition, in the second embodiment, in response to an operation on the operation panel by the user, the display is changed from the screen including the identification information to the operation screen. Accordingly, when the user wants to perform some operation, for example, the user can immediately perform the operation on the operation screen. In particular, since the operation screen that was displayed before the screen including the identification information is displayed, ease of use when the same user proceeds with an operation can be improved.

Third Embodiment

According to a third embodiment, an image processing device compares identification information of own image processing device with identification information of other image processing devices on a network, extracts a different portion of the identification information of the own image processing device, and displays the identification information with the extracted different portion being highlighted. Highlighting a different portion herein includes displaying the portion in a larger size than the rest, displaying the portion thicker than the rest, and displaying the portion in a different color. Highlighting also includes hatching or blinking the different portion. In other words, highlighting a different portion means displaying the different portion in a form that is more readily identifiable to the user than the other portion.

In the third embodiment, the network configuration, and the functional configuration and the hardware configuration of image processing devices are the same as those in the first embodiment and the description thereof will be omitted. A procedure for performing an operation according to the third embodiment will be described. The operation according to the third embodiment is implemented by the control unit 205 executing a program written in accordance with the following procedure.

Figure 8:
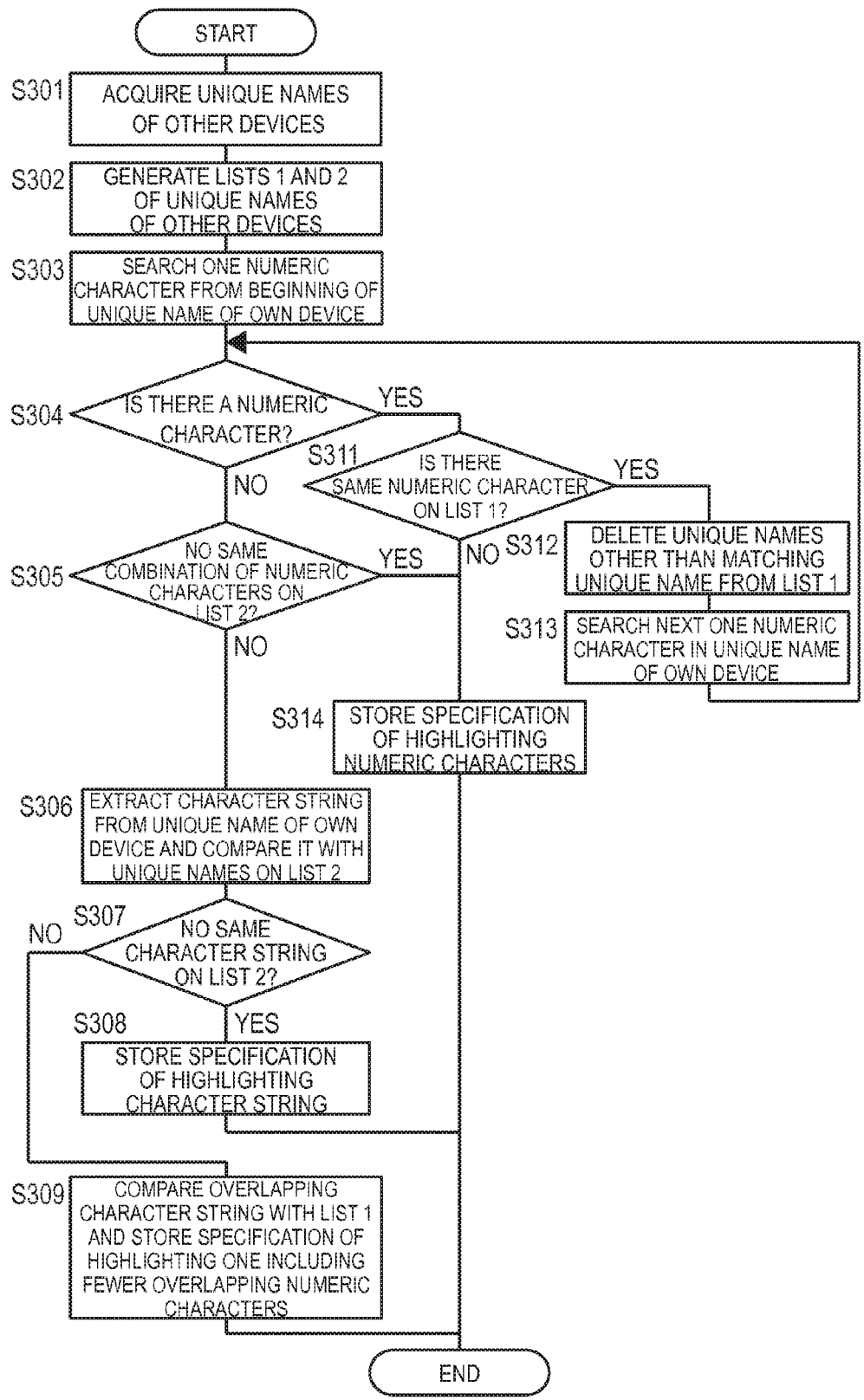
FIG. 8 is a flowchart illustrating a procedure for extracting a different portion from a unique name of an image processing device.

FIG. 8 is a flowchart illustrating a procedure for extracting a portion from a unique name of an image processing devices, as identification information of the image processing device, that is different from unique names of other image processing devices. Note that in the following description, an image processing device that performs the operation will be referred to as the "own device" and other image processing devices will be referred to as the "other devices".

First, the control unit 205 searches the other devices on the network 100 to acquire unique names of the other devices (S301). The process at S301 may be the same as multicast processing which is usually performed when an image processing device is searched from a PC or the like. In this way, information of the other devices can be acquired.

The control unit 205 then generates list 1 and list 2 based on the acquired unique names of the other devices (S302).

The control unit 205 then searches one numeric character from the beginning of the unique name of the own device (S303). If there is a numeric character (S304: YES), then the control unit 205 determines whether or not there is the same numeric character on list 1 (S311). If there is the same numeric character on list 1 (S311: YES), the control unit 205 deletes the unique names other than the unique name that matches the numeric character from list 1 (S312). The control unit 205 then searches next one numeric character in the unique name of the own device (S313). Then the control unit 205 returns to S304 and continues the process.

At S311, if there is not the same numeric character on list 1 (S311: NO), the control unit 205 specifies highlighting in order to highlight the numeric character and stores the specification in the storage unit 203 (S314). Then the control unit 205 ends the process.

If the unique name of the own device includes a numeric character and the unique names of the other devices also include numeric characters, the process from S303 to S314 highlights a numeric character that is included in the unique name of the own device and is not included in the unique names of the other devices.

On the other hand, at S304, if there is not a numeric character (S304: NO), the control unit 205 determines whether or not there is the same combination of numeric characters on list 2 (S305). After following the process from S303 to S314, a plurality of numeric characters have been found before S305. Therefore, at S305, the control unit 205 determines whether or not there is the same combination of numeric characters (in which the order of the numeric characters is also the same) on list 2. If there is not the same combination of numeric characters on list 2 (S305: YES), the control unit 205 stores specification of highlighting the numeric character portion that has been found before S305 in the storage unit 203 (S314). Then the control unit 205 ends the process. As a result of the process at S305 and S314, if the unique name includes the same numeric characters as numeric characters in other unique names, the different order of the numeric characters is highlighted.

At S305, if there is the same combination of numeric characters on list 2 (S305: NO), then the control unit 205 extracts a character string other than the numeric characters from the unique name of the own device and compares the extracted character string with the unique names on list 2 (S306). If there is not the same character string on list 2 (S307: YES), the control unit 205 stores specification of highlighting the character string of the own device in the storage unit 203 (S308). Then the control unit 205 ends the process. As a result of the process from S306 to S308, the different character string in the unique name is highlighted.

At 307, if there is the same character string on list 2 (S307: NO), the control unit 205 compares the overlapping character string with list 1 and stores specification of highlighting one that includes fewer overlapping numeric characters in the storage unit 203 (S309). Then the control unit 205 ends the process. As a result of process at S307 and S309, a portion that includes fewer overlapping numeric characters is highlighted if the unique name of the own device includes the same character string and the same numeric characters as those of unique names of other devices.

Figure 9:
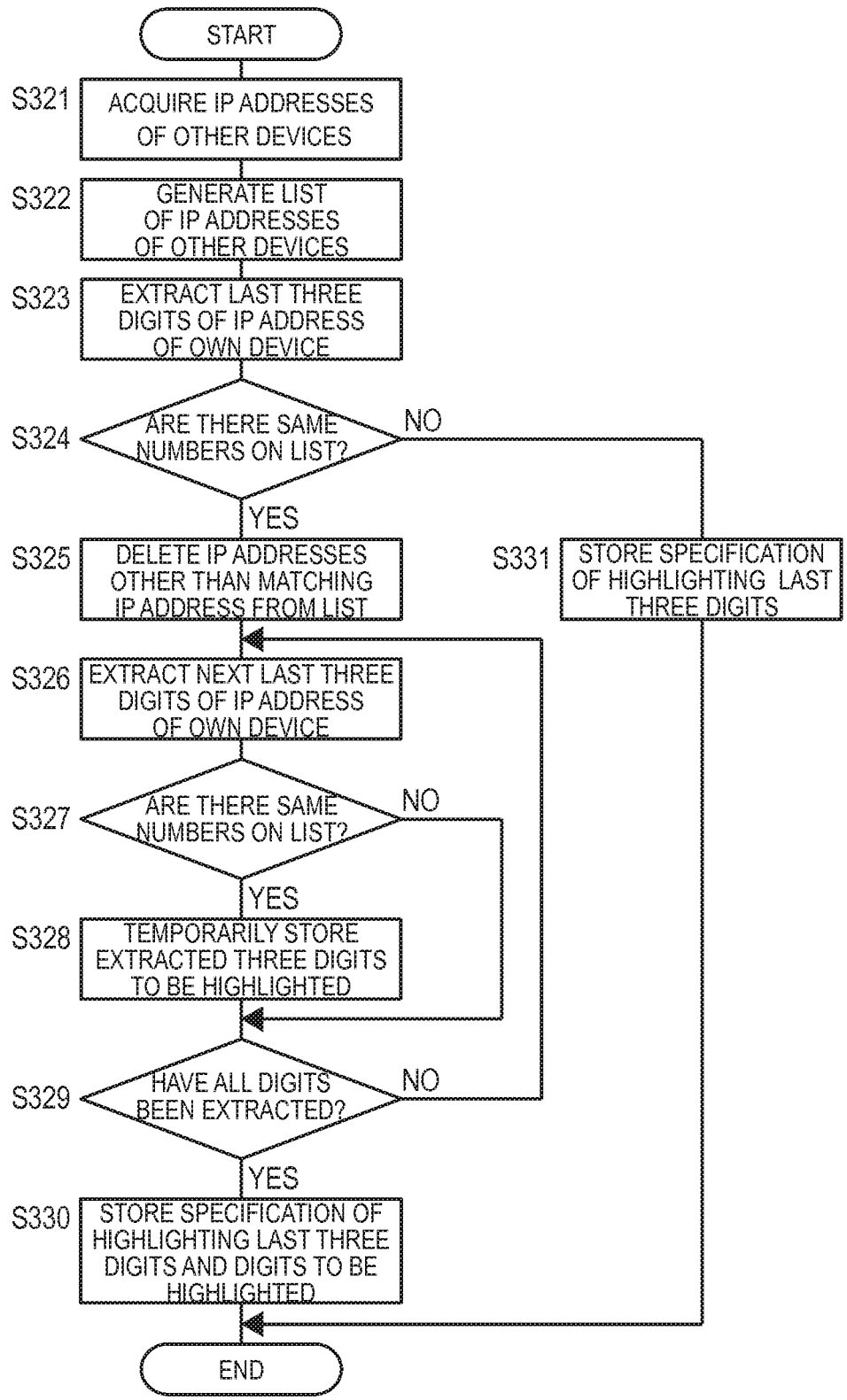
FIG. 9 is a flowchart illustrating a procedure for extracting a different portion from an IP address of an image processing device.

A procedure for extracting a different portion from an IP address will be described next. FIG. 9 is a flowchart illustrating a procedure for extracting a different portion from the IP address of an image processing device.

First, the control unit 205 searches other devices on the network 100 to acquire IP addresses of the other devices (S321). The process at S321 may be the same as multicast processing which is usually performed when an image processing device is searched from a PC or the like. In this way, information of the other devices can be acquired.

The control unit 205 then generates a list of the IP addresses based on the acquired IP addresses of the other devices (S322).

The control unit 205 then extracts the last three digits of the IP address of the own device (S323). Then the control unit 205 compares the three digits with the list and, if there are not the same numbers on the list (S324: NO), the control unit 205 specifies highlighting in order to highlight the last three digits and stores the specification in the storage unit 203 (S331). Then the control unit 205 ends the process.

On the other hand, if there are the same numbers on the list (S324: YES), the control unit 205 deletes the IP addresses other than the IP address that matches the numbers from the list (S325).

Then the control unit 205 extracts the next last three digits of the IP address of the own device (S326). Then, the control unit 205 compares the three digits with the list and, if there are not the same numbers on the list (S327: NO), the control unit 205 proceeds to S329.

At S327, if there are the same numbers as the extracted three digits, on the list (S327: YES), the control unit 205 temporarily stores the three digits as the digits to be highlighted (S328). The temporary storage may be storage on the memory 314 or the storage unit 203.

Then, the control unit 205 determines whether or not all digits have been extracted (S329). If not all digits have been extracted (S329: NO), the control unit 205 returns to S326 and proceeds with the rest of the process.

On the other hand, if all digits have been extracted (S329: YES), the control unit 205 stores specification of highlighting the last three digits and the digits which is temporarily stored as digits to be highlighted at S328 in the storage unit 203 (S330). Then the control unit 205 ends the process.

As a result of the process described above, a portion of the IP address of the own device that is different from the IP addresses of the other devices is highlighted.

Procedures for extracting different portions of a unique name and an IP address have been described; a process for displaying identification information is also performed in the third embodiment in accordance with the same procedure as that in the first or second embodiments. Specifically, the identification information is displayed in response to detection of a person by the motion sensor 110. In the third embodiment, however, when the identification information is displayed (at S102 of the first embodiment or S202 of the second embodiment), the specification of highlighting stored in the storage unit 203 is read and a different portion is highlighted in accordance with the procedure described above.

Figure 10:
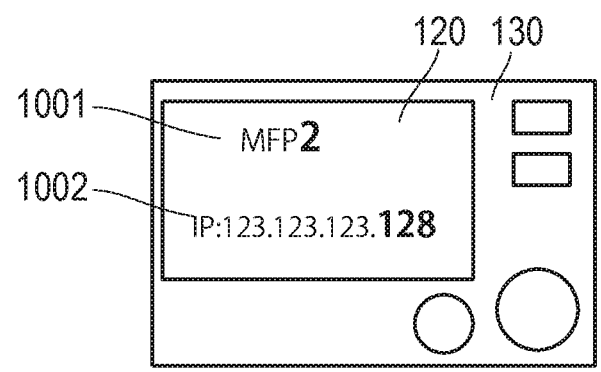
FIG. 10 is a diagram illustrating an exemplary display on a display panel according to a third embodiment.

FIG. 10 is a diagram illustrating an exemplary display on a display panel according to the third embodiment. When the motion sensor 110 detects a person, the unique name 1001, "MFP2", and the IP address 1002 of the image processing device 102 are displayed as illustrated in FIG. 10. In this display, a different portion is highlighted.

In this way, in the third embodiment, identification information for distinguishing the image processing device from other image processing devices is displayed on the display panel in response to detection of approach of a person to the image processing device by the motion sensor. In addition, since the identification information is displayed with a portion of identification information that is different from identification information of other image processing devices being highlighted, only the portion of the unique name, IP address or the like of the device that is different from that of the other image processing devices is more recognizable. The third embodiment has the same advantageous effects of the first and second embodiments as well, of course. Accordingly, the user can know the identification information of the image processing device without performing any particular operation or without having to know how to perform any particular operation.

Fourth Embodiment

According to a fourth embodiment, information indicating that an image processing device has displayed identification information (hereinafter referred to as display information) is stored and, when an image processing device search (hereinafter referred to as a device search) is made from a PC within a first predetermined time, the display information is sent back to the PC together with information indicating the image processing device (hereinafter referred to as device information).

In the fourth embodiment, the network configuration, and the functional configuration and the hardware configuration of image processing devices are the same as those in the first embodiment and the description thereof will be omitted. A procedure for performing an operation according to the fourth embodiment will be described. The operation according to the fourth embodiment is implemented by the control unit 205 executing a program written in accordance with the following procedure.

Figure 11:
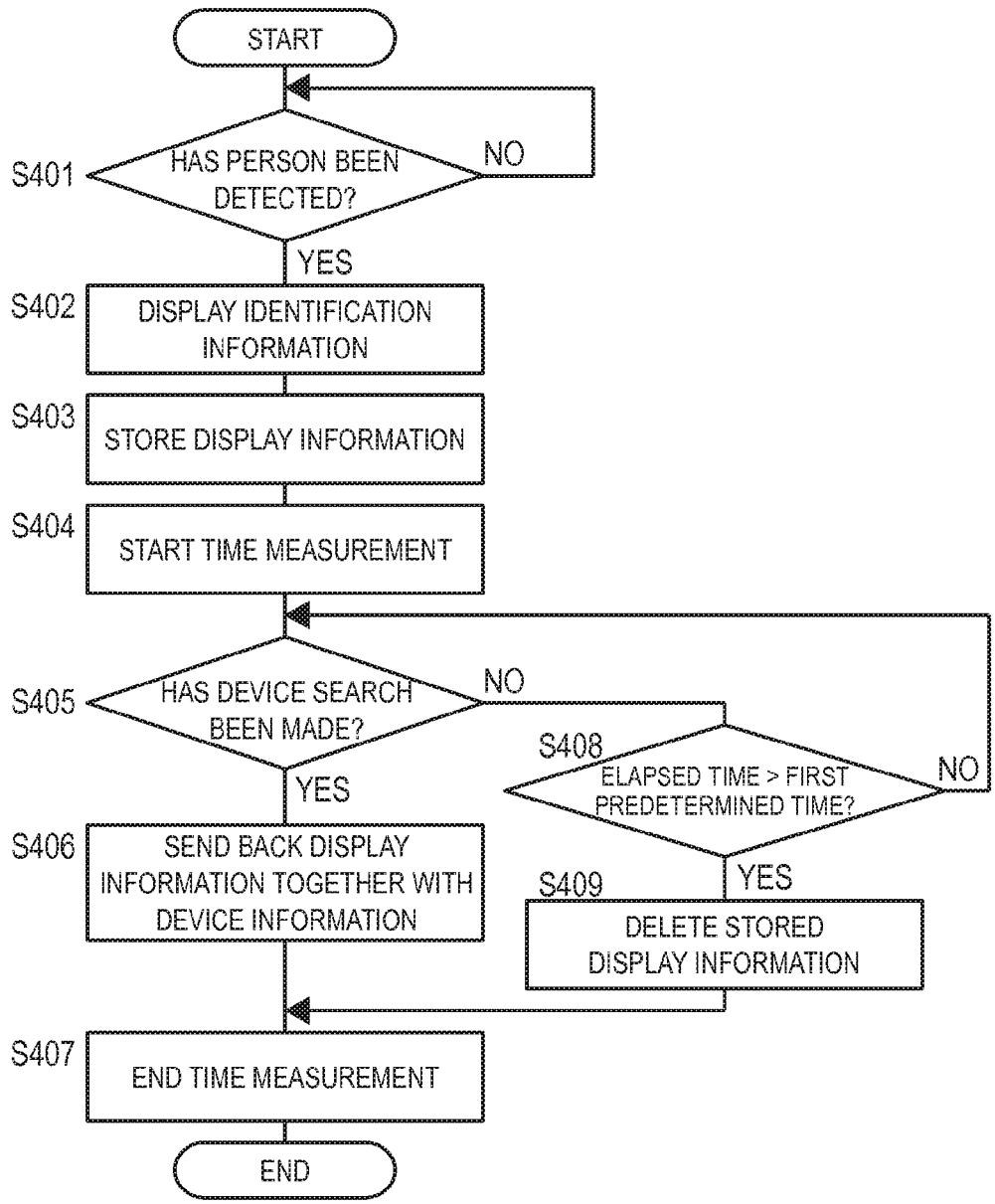
FIG. 11 is a flowchart illustrating a procedure according to a fourth embodiment.

FIG. 11 is a flowchart illustrating a procedure according to the fourth embodiment.

First, the control unit 205 determines whether or not the motion sensor 110 has detected a person (S401). When the motion sensor 110 has not detected a person (S401: NO), the control unit 205 waits in a standby state. On the other hand, when the motion sensor 110 has detected a person (S401: YES), the control unit 205 retrieves identification information from the storage unit 203, sends the identification information to the display unit 202 to cause the display unit 202 to display the identification information (S402). This causes the display unit 202 to display a screen including the identification information on the display panel 120. The display unit 202 may display all pieces of identification information that can be displayed as the identification information. Alternatively, the display unit 202 may display only predetermined one or some pieces of identification information.

The control unit 205 then stores the display information in the storage unit 203 (S403). Note that the information is stored on the flash ROM 321 or the HDD 323 which makes up the storage unit 203, or on the memory 314. The control unit 205 then starts time measurement (S404). Note that the control unit 205 may start time measurement before storing the display information in the storage unit 203 as long as after causing the display unit 202 to display the identification information.

The control unit 205 then determines whether or not a device search has been made from the PC 150, for example (S405). If a device search has been made (S405: YES), the control unit 205 retrieves the display information from the storage unit 203 and sends the display information back to the PC 150 that has made the device search together with the device information (S406). The device information herein includes the IP address, unique name, model name, model number or the like, for example, of the image processing device 101 (the same applies in other embodiments).

Then the control unit 205 ends time measurement (S407) and ends the process.

On the other hand, if a device search has not been made (S405: NO), the control unit 205 checks elapsed time to determine whether or not the first predetermined time has elapsed since the display of the identification information (S408). If the first predetermined time has not elapsed (S408: NO), the control unit 205 returns to S405. If the first predetermined time has elapsed (S408: YES), the control unit 205 deletes the display information from the storage unit 203 (S409). Then the control unit 205 ends time measurement (S407) and ends the process.

When displaying a result of a device search in a list, the PC 150 which has received the display information can, for example, highlight the identification information of the image processing device that has sent back the display information or can display the identification information at the top of the list.

Figure 12:
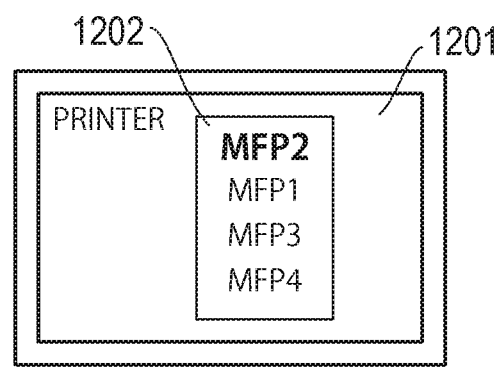
FIG. 12 is a diagram illustrating an exemplary display of a result of an image processing device search on a terminal device.

FIG. 12 is a diagram illustrating an exemplary display of a result of an image processing device search on a PC, which is a terminal device. The exemplary display in FIG. 12 illustrates an example displayed when a device search has been made from a PC 150 and an image processing device 102 has sent back display information.

As illustrated, a printer selection screen 1202 is displayed on the display 1201 of the PC 150 as a result of the devise search. Since the image processing device 102 has sent back the display information, the PC 150 displays the unique name "MFP2" at the top of the list and highlights the unique name. The PC 150 may use other highlighting methods such as displaying the characters of the identification information in a color different from the color of identification information of other image processing devices.

In the fourth embodiment, as in the third embodiment, the PC 150 may highlight a different portion of the unique name or the IP address of the image processing device 102 that has sent back the display information. The process for extracting the different portion may be performed on the image processing device 102 as in the third embodiment. Alternatively, the process for extracting the different portion may be performed on the PC 150. If the different portion is extracted on the PC 150, the image processing device 102 that has sent back the display information may be set as the own device and the other image processing devices 101, 103, 104 that have found by the device search may be set as the other devices in the procedure described in the third embodiment (FIG. 8 or 9) and the process may be performed.

According to the fourth embodiment, when a device search is made from a PC within the first predetermined time, display information is sent back to the PC together with device information. Accordingly, the user can know the identification information of the image processing device without performing any particular operation, as in the first embodiment. Since the PC can display the image processing device that has displayed the identification information in a readily identifiable manner to the user, convenience to the user in selecting an image processing device to use can be improved.

Further, in the fourth embodiment, the display information is deleted from storage unit after the lapse of the first predetermined time since the display of the identification information. Typically, a user wants to know the identification information of an image processing device in order to use the image processing device within a predetermined time since the display of the identification information. If the display information were stored indefinitely, the display information would be sent to a PC of another user (for example, a user other than the user who has caused the identification information to be displayed) when the other user makes a device search at a later time. If that is the case, for the other user, an image processing device different from the device the other user wants to use is highlighted in the list of the result of a search result or displayed at the top of the list. To prevent this, the display information is deleted from storage unit after the lapse of the first predetermined time in the fourth embodiment. Accordingly, the display information is not sent back when a PC makes a device search after the lapse of the first predetermined time. Therefore after the lapse of the time, highlighting or modification to a list which is unnecessary for other users is not made. Further, when the time has elapsed without a device search from a PC, the user who has caused the identification information to be displayed is also unlikely to use the device. In such a case, an unnecessary modification to a list or highlighting is not made on the PC of the user who has caused the identification information to be displayed.

For the reasons described above, the first predetermine time is preferably the time required for a person (a user) who approached the image processing device (i.e. a person who was detected by the motion sensor) to check the identification information, return to the PC, and make a device search from the PC. The first predetermined time may be set by a user to any value and the time required for checking identification information and the time required for performing an operation for making a device search from the PC, may be determined by experiment or on the basis of experience, for example. If the distance between a PC and an image processing device is long, the first predetermined time is preferably chosen to be long and if the distance between a PC and an image processing device is short, the first predetermined time is preferably chosen to be short.

Fifth Embodiment

According to a fifth embodiment, when a device search is made from a PC within a second predetermined time after a motion sensor no longer detects a person, display information is sent back to the PC together with device information.

In the fifth embodiment, the network configuration, and the functional configuration and the hardware configuration of image processing devices are the same as those in the first embodiment and the description thereof will be omitted. A procedure for performing an operation according to the fifth embodiment will be described. The operation according to the fifth embodiment is implemented by the control unit 205 executing a program written in accordance with the following procedure.

Figure 13:
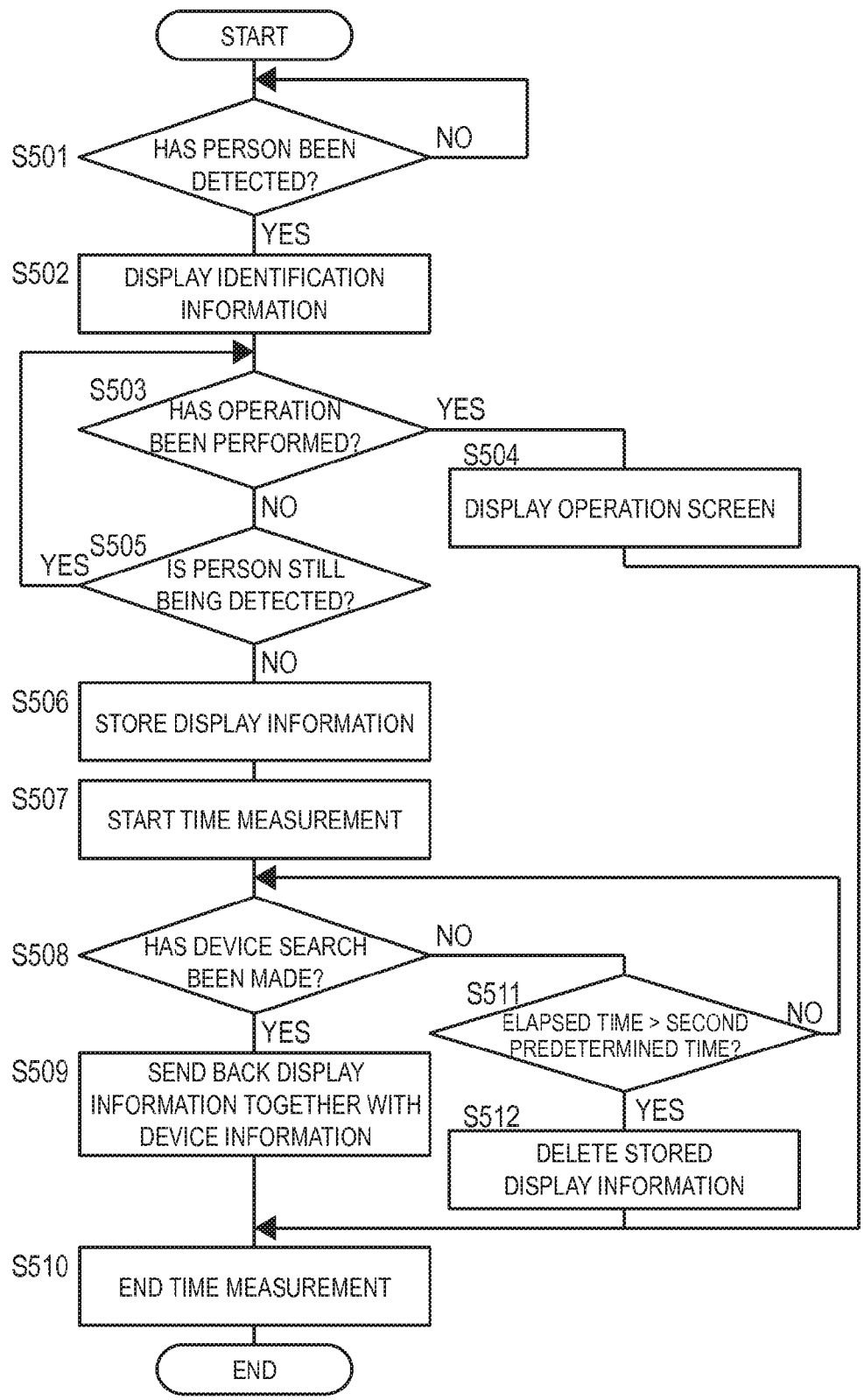
FIG. 13 is a flowchart illustrating a procedure according to a fifth embodiment.

FIG. 13 is a flowchart illustrating a procedure according to the fifth embodiment.

First, the control unit 205 determines whether or not the motion sensor 110 has detected a person (S501). When the motion sensor 110 has not detected a person (S501: NO), the control unit 205 waits in a standby state. On the other hand, when the motion sensor 110 has detected a person (S501: YES), the control unit 205 retrieves identification information from the storage unit 203, sends the identification information to the display unit 202 to cause the display unit 202 to display the identification information (S502). This causes the display unit 202 to display a screen including the identification information on the display panel 120. The display unit 202 may display all pieces of identification information that can be displayed as the identification information. Alternatively, the display unit 202 may display only predetermined one or some pieces of identification information.

The control unit 205 then determines whether or not some operation has been performed on an operation panel 130 (S503). When some operation has been performed (S503: YES), the control unit 205 changes display from the screen including the identification information displayed on the display unit 202 to an operation screen and causes the display unit 202 to display the operation screen (S504). The display unit 202 thus displays the operation screen on the display panel 120. Then the control unit 205 ends the process.

On the other hand, when no operation has been performed (S503: NO), the control unit 205 then determines whether or not the motion sensor 110 is still detecting the person (S505). If the motion sensor 110 is still detecting the person (S505: YES), the control unit 205 returns to S503. This allows the identification information to continue to be displayed.

On the other hand, at S505, If the motion sensor 110 no longer detects the person (S505: NO), the control unit 205 stores the display information in the storage unit 203 (S506). Note that the information is stored on the flash ROM 321 or the HDD 323 which makes up the storage unit 203, or on the memory 314. Although not illustrated, when the motion sensor 110 no longer detects the person (S505: NO), the display panel 120 may be blanked by a power saving mode or the like.

Then the control unit 205 starts time measurement (S507). The control unit 205 may start time measurement before storing the display information in the storage unit 203 as long as after the motion sensor 110 no longer detects the person.

The control unit 205 then determines whether or not a device search has been made from the PC 150, for example (S508). If a device search has been made (S508: YES), the control unit 205 retrieves the display information from the storage unit 203 and sends the display information back to the PC 150 that has made the device search together with the device information (S509). Then the control unit 205 ends time measurement (S510) and ends the process.

On the other hand, if a device search has not been made (S508: NO), the control unit 205 checks elapsed time to determine whether or not the second predetermined time has elapsed since the motion sensor 110 no longer detected the person (S511). If the second predetermined time has not elapsed (S511: NO), the control unit 205 returns to S508. If the second predetermined time has elapsed (S511: YES), the control unit 205 deletes the display information from the storage unit 203 (S512). Then the control unit 205 ends time measurement (S510) and ends the process.

When displaying a result of a device search in a list, the PC 150 which has received the display information can, for example, highlight the identification information of the image processing device that has sent back the display information or can display the identification information at the top of the list. An exemplary display is substantially the same as the example described in the fourth embodiment illustrated in FIG. 12.

In the fifth embodiment, the PC 150 may display the characters of the identification information in a color different from the color of identification information of other image processing devices. Further, as in the third embodiment, the PC 150 may highlight a different portion of the unique name or the IP address of the image processing device that has sent back the display information. The process for extracting the different portion is the same as the process in the third embodiment. Further, as described in the fourth embodiment, the process for extracting the different portion may be performed on the PC.

According to the fifth embodiment, when a device search is made from a PC within the second predetermined time after the motion sensor no longer detects the person, i.e. after the person leaves the vicinity of the image processing device, display information is sent back to the PC together with device information. Accordingly, as in the first embodiment, the user can know the identification information of the image processing device without performing any particular operation. The PC can display the image processing device that has displayed the identification information in a readily identifiable manner to the user.

Further, in the fifth embodiment, the display information is deleted from storage unit after the lapse of the second predetermined time after the motion sensor no longer detected the person. Accordingly, the display information is not sent back when a PC makes a device search after the lapse of the second predetermined time. Therefore, as in the fourth embodiment, after the lapse of the time, highlighting or a modification to the list which is unnecessary for other users and for the user who has caused the identification information to be displayed is not made.

For the reasons described above, the second predetermine time is preferably the time required for a person (a user) who left the image processing device to return to the PC and make a device search from the PC. The second predetermined time may be set by a user to any value and the time required for performing an operation for making a device search from the PC may be determined by experiment or on the basis of experience, for example. If the distance between a PC and an image processing device is long, the second predetermined time is preferably chosen to be long and if the distance between a PC and an image processing device is short, the second predetermined time is preferably chosen to be short.

As to a relationship with the first predetermined time in the fourth embodiments, since the second predetermined time does not include the time for checking the identification information, the second predetermined time is preferably shorter than the first predetermined time.

Sixth Embodiment

According to a sixth embodiment, time at which an image processing device has displayed identification information (hereinafter referred to as identification information display starting time) is stored and, when a device search is made from a PC within a first predetermined time, the identification information display starting time is sent back to the PC together with device information.

In the sixth embodiment, the network configuration, and the functional configuration and the hardware configuration of image processing devices are the same as those in the first embodiment and the description thereof will be omitted. A procedure for performing an operation according to the sixth embodiment will be described. The operation according to the sixth embodiment is implemented by the control unit 205 executing a program written in accordance with the following procedure.

Figure 14:
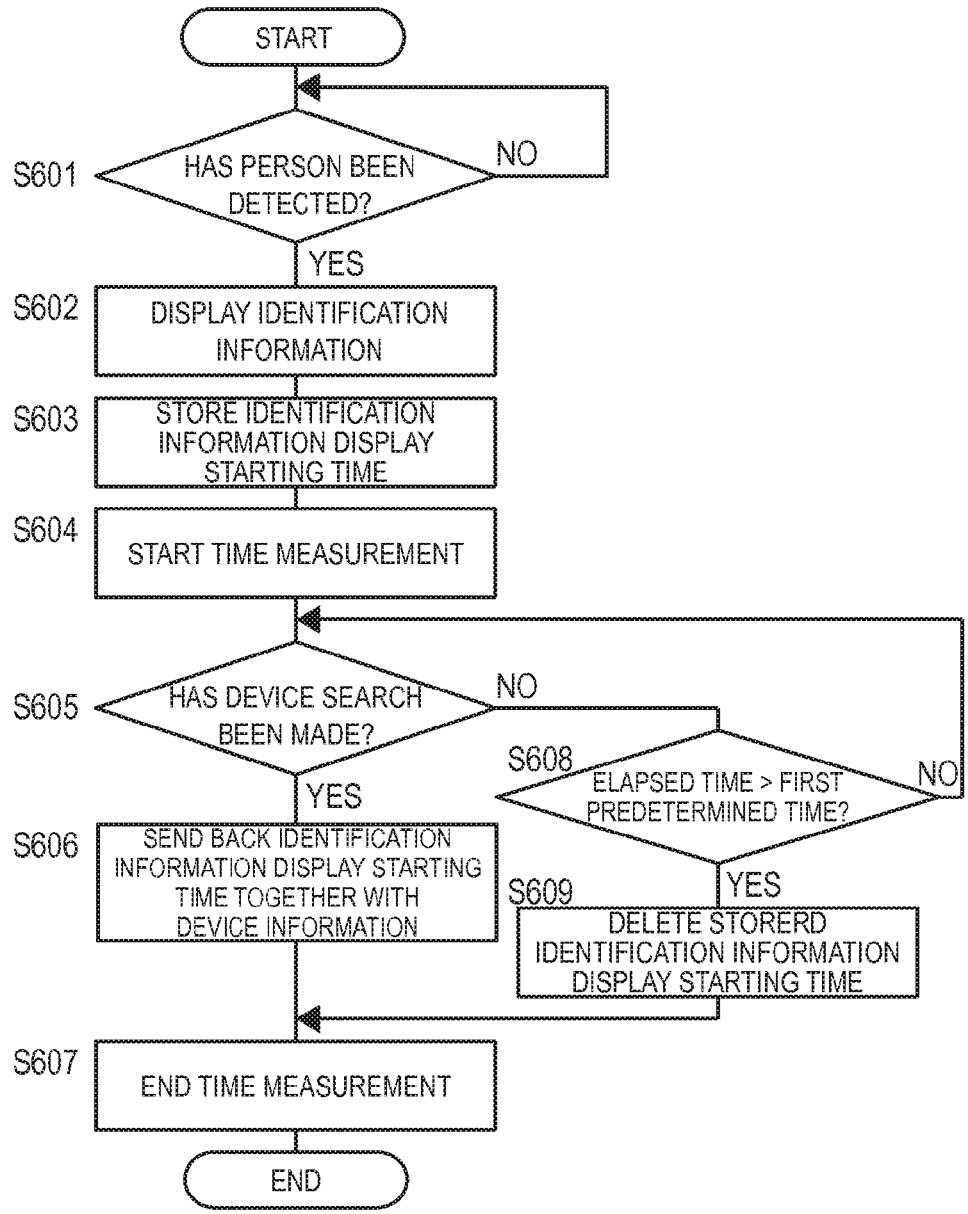
FIG. 14 is a flowchart illustrating a procedure according to a sixth embodiment.

FIG. 14 is a flowchart illustrating a procedure according to the sixth embodiment.

First, the control unit 205 determines whether or not the motion sensor 110 has detected a person (S601). When the motion sensor 110 has not detected a person (S601: NO), the control unit 205 waits in a standby state. On the other hand, when the motion sensor 110 has detected a person (S601: YES), the control unit 205 retrieves identification information from the storage unit 203, sends the identification information to the display unit 202 to cause the display unit 202 to display the identification information (S602). This causes the display unit 202 to display a screen including the identification information on the display panel 120. The display unit 202 may display all pieces of identification information that can be displayed as the identification information. Alternatively, the display unit 202 may display only predetermined one or some pieces of identification information.

The control unit 205 then stores the identification information display starting time in the storage unit 203 (S603). Note that the information is stored on the flash ROM 321 or the HDD 323 which makes up the storage unit 203, or on the memory 314.

The control unit 205 then starts time measurement (S604). Note that the control unit 205 may start time measurement before storing the identification information display starting time in the storage unit 203 as long as after causing the display unit 202 to display the identification information.

The control unit 205 then determines whether or not a device search has been made from the PC 150, for example (S605). If a device search has been made (S605: YES), the control unit 205 retrieves the identification information display starting time from the storage unit 203 and sends the identification information display starting time back to the PC 150 that has made the device search together with the device information (S606). Then the control unit 205 ends time measurement (S607) and ends the process.

On the other hand, if a device search has not been made (S605: NO), the control unit 205 determines whether or not the first predetermined time has elapsed since the display of the identification information (S608). If the first predetermined time has not elapsed (S608: NO), the control unit 205 returns to S605. If the first predetermined time has elapsed (S608: YES), the control unit 205 deletes the identification information display starting time from the storage unit 203 (S609). Then the control unit 205 ends time measurement (S607) and ends the process.

When displaying a result of a device search in a list, the PC 150 which has received the identification information display starting time can, for example, display the result in order of identification information display starting time (which is preferably changeable as specified by a user, for example between ascending and descending orders).

Figure 15:
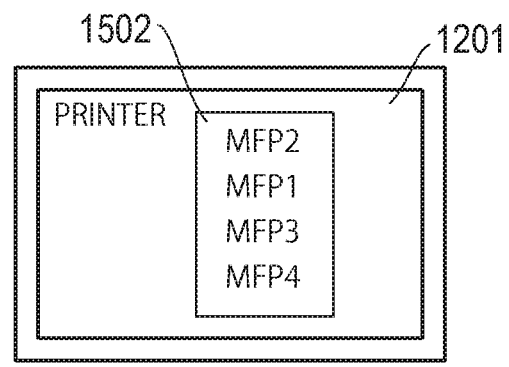
FIG. 15 is a diagram illustrating an exemplary display of a result of an image processing device search on a terminal device.

FIG. 15 is a diagram illustrating an exemplary display of a result of an image processing device search on a PC, which is a terminal device. The exemplary display in FIG. 15 illustrates an example displayed when a device search has been made from a PC 150 and an image processing device 102 has sent back an identification information display starting time.

As illustrated, a printer selection screen 1502 is displayed on the screen 1201 of the PC 150 as a result of the devise search. In this example, the identification information display starting time of an image processing device 102 that has a unique name, "MFP2", is the latest time. Accordingly, the PC 150 displays "MFP2" having the latest identification information display starting time at the top of the list.

In addition to or instead of such sorting, the PC 150 may highlight the identification information of the image processing device whose the identification information display starting time is the latest or may display the characters of the identification information in a color different from the color of identification information of other image processing devices. Further, as in the third embodiment, the PC 150 may highlight a different portion of the unique name or the IP address of the image processing device whose identification information display starting time is the latest. The process for extracting the different portion is substantially the same as the process in the third embodiment. Further, as described in the fourth embodiment, the process for extracting the different portion may be performed on the PC.

According to the sixth embodiment, when a device search is made from a PC within the first predetermined time, an identification information display starting time is sent back to the PC together with device information. Accordingly, as in the first embodiment, the user can know the identification information of the image processing device without performing any particular operation, as in the first embodiment. Further, because the PC receives identification information display starting times, the PC can display image processing devices that have displayed identification information in order of the identification information display starting time. Accordingly, the user can readily identify the image processing device to which the user has just approached because the image processing device is displayed at the top (or at the bottom) of the list. In addition, the PC may also display the identification information display starting times in the list. This allows the user to identify the image processing device to which the user approached, from the time at which the user approached the image processing device, or from the current time when the user immediately returned to the PC. Further, in the sixth embodiment, the identification information display starting time is deleted from storage unit after the lapse of the first predetermined time since the display of the identification information. Accordingly, as in the fourth embodiment, after the lapse of the time, highlighting or a modification to the list which is unnecessary for other users and for the user who has caused the identification information to be displayed is not made.

Note that the first predetermined time in the sixth embodiment is the same as the first predetermined time in the fourth embodiment. This is because the time elapsed after displaying identification information is measured and, if the time is long, the stored information is deleted in both of the embodiments.

Seventh Embodiment

According to a seventh embodiment, time at which a motion sensor no longer detected a person (hereinafter referred to as non-detected time) is stored and, when a device search is made from a PC within a second predetermined time, the non-detected time is sent back to the PC together with device information.

In the seventh embodiment, the network configuration, and the functional configuration and the hardware configuration of image processing devices are the same as those in the first embodiment and the description thereof will be omitted. A procedure for performing an operation according to the seventh embodiment will be described. The operation according to the seventh embodiment is implemented by the control unit 205 executing a program written in accordance with the following procedure.

Figure 16:
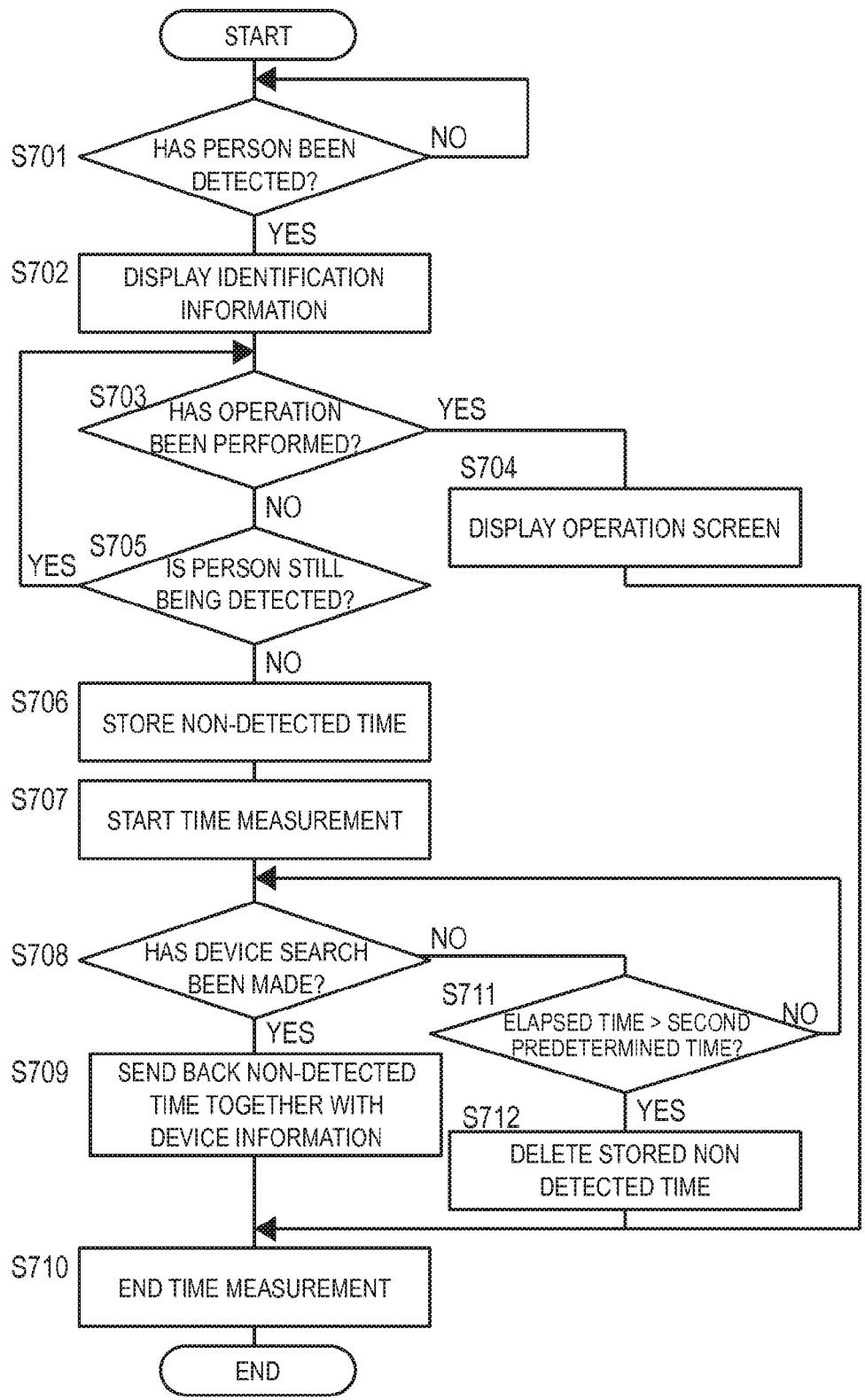
FIG. 16 is a flowchart illustrating a procedure according to a seventh embodiment.

FIG. 16 is a flowchart illustrating a procedure according to the seventh embodiment.

First, the control unit 205 determines whether or not the motion sensor 110 has detected a person (S701). When the motion sensor 110 has not detected a person (S701: NO), the control unit 205 waits in a standby state. On the other hand, when the motion sensor 110 has detected a person (S701: YES), the control unit 205 retrieves identification information from the storage unit 203, sends the identification information to the display unit 202 to cause the display unit 202 to display the identification information (S702). This causes the display unit 202 to display a screen including the identification information on the display panel 120. The display unit 202 may display all pieces of identification information that can be displayed as the identification information. Alternatively, the display unit 202 may display only predetermined one or some pieces of identification information.

The control unit 205 then determines whether or not some operation has been performed on an operation panel 130 (S703). When some operation has been performed (S703: YES), the control unit 205 changes display from the screen including the identification information displayed on the display unit 202 to an operation screen and causes the display unit 202 to display the operation screen (S704). The display unit 202 thus displays the operation screen on the display panel 120. Then the control unit 205 ends the process.

On the other hand, when no operation has been performed (S703: NO), the control unit 205 then determines whether or not the motion sensor 110 is still detecting the person (S705). If the motion sensor 110 is still detecting the person (S705: YES), the control unit 205 returns to S703. This allows the identification information to continue to be displayed.

On the other hand, at 705, If the motion sensor 110 no longer detects the person (S705: NO), the control unit 205 stores the non-detected time in the storage unit 203 (S706). Note that the information is stored on the flash ROM 321 or the HDD 323 which makes up the storage unit 203, or on the memory 314.

Then the control unit 205 starts time measurement (S707). The control unit 205 may start time measurement before storing the non-detected time in the storage unit 203 as long as after the motion sensor 110 no longer detects the person.

The control unit 205 then determines whether or not a device search has been made from the PC 150, for example (S708). If a device search has been made (S708: YES), the control unit 205 retrieves the non-detected time from the storage unit 203 and sends the non-detected time back to the PC 150 that has made the device search together with the device information (S709). Then the control unit 205 ends time measurement (S710) and ends the process.

On the other hand, if a device search has not been made (S708: NO), the control unit 205 checks elapsed time to determine whether or not the second predetermined time has elapsed since the motion sensor 110 no longer detected the person (S711). If the second predetermined time has not elapsed (S711: NO), the control unit 205 returns to S708. If the second predetermined time has elapsed (S711: YES), the control unit 205 deletes the non-detected time from the storage unit 203 (S712). Then the control unit 205 ends time measurement (S710) and ends the process.

When displaying a result of a device search in a list, the PC 150 which has received the non-detected time can, for example, display the result in order of non-detected time (which is preferably changeable as specified by a user, for example between ascending and descending orders). An exemplary display on the PC 150 in this case is substantially the same as the example in the sixth embodiment illustrated in FIG. 15, for example. In the seventh embodiment, in addition to sorting the image processing devices that have displayed identification information in order of non-detected time, the PC 150 may highlight the identification information of the image processing device whose the non-detected time is the latest or may display the characters of the identification information in a different color. Further, as in the third embodiment, the PC 150 may highlight a different portion of the unique name or the IP address of the image processing device whose non-detected time is the latest. The process for extracting the different portion is substantially the same as the process in the third embodiment. Further, as described in the fourth embodiment, the process for extracting the different portion may be performed on the PC.

According to the seventh embodiment, the non-detected time, i.e. the time at which the person left the vicinity of the image processing device is stored and, when a device search is made from a PC within the second predetermined time, the non-detected time is sent back to the PC together with the device information. Accordingly, as in the first embodiment, the user can know the identification information of the image processing device without performing any particular operation and the PC can display the image processing device in a readily identifiable manner to the user. In addition, since the time at which the person left is sent back to the PC, the image processing device which the user has just left is displayed at the top of the list when the user makes a device search immediately after the user returned to the PC. Accordingly, the image processing device is readily identifiable to the user.

In the seventh embodiment, the non-detected time is deleted from storage unit after the lapse of the second predetermined time since the motion sensor no longer detected the person. Since the non-detected time does not remain stored indefinitely, as in the fourth embodiment, after the lapse of the time, the highlighting or a modification to the list which is unnecessary for other users and for the user who has caused the identification information to be displayed is not made.

Note that the second predetermined time in the seventh embodiment is the same as the second predetermined time in the fifth embodiment. This is because the time elapsed after the motion sensor no longer detected a person is measured and, if the time is long, the stored information is deleted in both of the embodiments.

Eighth Embodiment

An eighth embodiment stores display information and sends the display information back to a PC when a device search is made from the PC within a first predetermined time as in the fourth embodiment. Further, in the eighth embodiment, when duration of time a motion sensor is detecting a person is less than a third predetermined time, the display information is not sent back in response to a device search made from the PC.

In the eighth embodiment, the network configuration, and the functional configuration and the hardware configuration of image processing devices are the same as those in the first embodiment and the description thereof will be omitted. A procedure for performing an operation according to the eighth embodiment will be described. The operation according to the eighth embodiment is implemented by the control unit 205 executing a program written in accordance with the following procedure.

Figure 17:
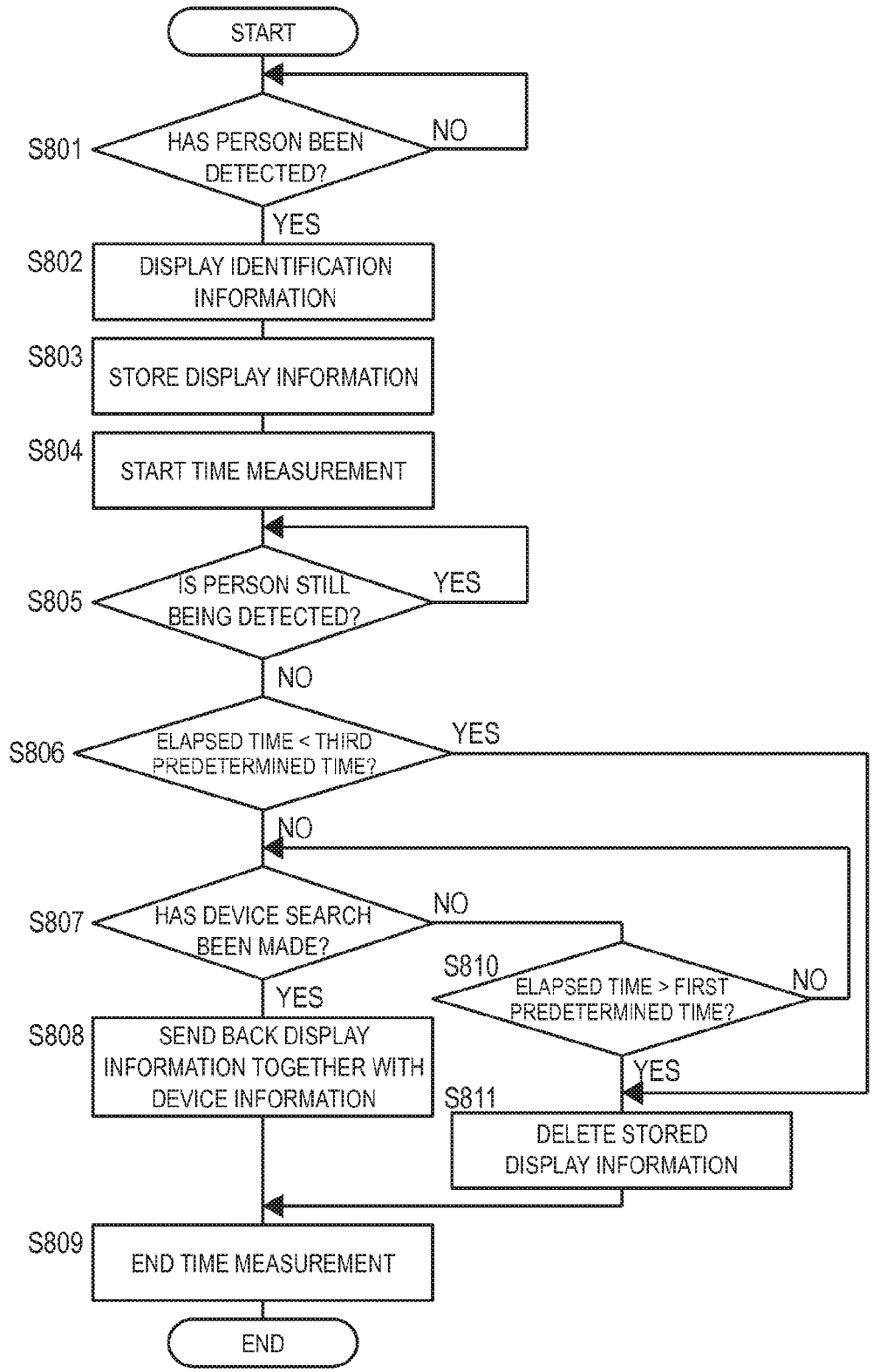
FIG. 17 is a flowchart illustrating a procedure according to an eighth embodiment.

FIG. 17 is a flowchart illustrating a procedure according to the eighth embodiment.

First, the control unit 205 determines whether or not the motion sensor 110 has detected a person (S801). When the motion sensor 110 has not detected a person (S801: NO), the control unit 205 waits in a standby state. On the other hand, when the motion sensor 110 has detected a person (S801: YES), the control unit 205 retrieves identification information from the storage unit 203, sends the identification information to the display unit 202 to cause the display unit 202 to display the identification information (S802). This causes the display unit 202 to display a screen including the identification information on the display panel 120. The display unit 202 may display all pieces of identification information that can be displayed as the identification information. Alternatively, the display unit 202 may display only predetermined one or some pieces of identification information.

The control unit 205 then stores the display information in the storage unit 203 (S803). Note that the information is stored on the flash ROM 321 or the HDD 323 which makes up the storage unit 203, or on the memory 314.

The control unit 205 then starts time measurement (S804). Note that the control unit 205 may start time measurement before storing the display information in the storage unit 203 as long as after causing the display unit 202 to display the identification information.

The control unit 205 then determines whether or not the motion sensor 110 is still detecting the person (S805). If the motion sensor 110 is still detecting the person (S805: YES), the control unit 205 waits in a standby state.

If the motion sensor 110 no longer detects the person (S805: NO), the control unit 205 checks the elapsed time at the present time to determine whether or not the elapsed time is less than the third predetermined time (S806).

The third predetermined time is the time that is so short that a person approaching the image processing device may not check the identification information. For example, when a person passes by the image processing device, the identification information is immediately displayed (the process at S801 and S802). However, the identification information usually is not checked in the time taken for a person to pass by the image processing device. The third predetermined time may be set by a user to any value and the time required for checking the identification information may be determined by experiment or on the basis of experience, for example.

At S806, if the elapsed time is less than the third predetermined time (S806: YES), the control unit 205 deletes the stored display information from the storage unit 203 (S811). Then the control unit 205 ends time measurement (S809) and ends the process.

On the other hand, if the elapsed time is not less than the third predetermined time (S806: NO), the control unit 205 then determines whether or not a device search has been made from the PC 150, for example (S807). If a device search has been made (S807: YES), the control unit 205 retrieves the display information from the storage unit 203 and sends the display information back to the PC 150 that has made the device search together with the device information (S808). Then the control unit 205 ends time measurement (S809) and ends the process.

On the other hand, if a device search has not been made (S807: NO), the control unit 205 determines whether or not the first predetermined time has elapsed since the display of the identification information (S810). If the first predetermined time has not elapsed (S810: NO), the control unit 205 returns to S807. If the first predetermined time has elapsed (S810: YES), the control unit 205 deletes the stored display information from the storage unit 203 (S811). Then the control unit 205 ends time measurement (S809) and ends the process.

When displaying a result of a device search in a list, the PC 150 which has received the display information can, for example, highlight the identification information of the image processing device that has sent back the display information or can display the identification information at the top of the list. An exemplary display is substantially the same as the example described in the fourth embodiment illustrated in FIG. 12. In the eighth embodiment, in addition to sorting the list, the PC 150 may highlight or display the character in a different color. Further, as in the third embodiment, the PC 150 may highlight a different portion of the unique name or the IP address of the image processing device that has sent back the display information. If the process for extracting the different portion is performed on the image processing device, the process may be the same as the process in the third embodiment. If the process for extracting the different portion is performed on the PC, the process is the same as described in the fourth embodiment.

According to the eighth embodiment, since identification information is displayed simply by approaching the image processing device, the user can know the identification information of the image processing device without performing any particular operation, as in the first embodiment. In addition, display information is sent back in response to a device search made from the PC together with device information. This allows the PC to display the image processing device that has displayed the identification information in a readily identifiable manner to the user. Further, in the eighth embodiment, when the duration of time the motion sensor is detecting a person is less than the third predetermined time, for example when the duration of time is too short for the person to check the displayed identification information, the display information is not sent back to the PC in response to a device search subsequently made from the PC. Accordingly, if a device search is made from a PC at the timing such as when a person simply passes by the image processing device, a modification to the list of the result of a device search or the like on the PC can be avoided.

Further, in the eighth embodiment, the stored display information is deleted after the lapse of the first predetermined time since the display of the identification information. Accordingly, the display information is not sent back to the PC in response to a device search made after the lapse of the time. The first predetermined time in the eighth embodiment is the same as the first predetermined time in the fourth embodiment.

Note that the eighth embodiment can be performed in conjunction with the fifth embodiment described previously to avoid sending display information back to a PC in response to a device search made from the PC when the duration of time the motion sensor is detecting a person is less than the third predetermined time.

The eighth embodiment can be performed in conjunction with the sixth embodiment described previously to avoid sending the identification information display starting time back to a PC in response to a device search made from the PC when the duration of time the motion sensor is detecting a person is less than the third predetermined time. Further, the eighth embodiment can be performed in conjunction with the seventh embodiment described previously to avoid sending the non-detected time back to a PC in response to a device search made from the PC when the duration of time the motion sensor is detecting a person is less than the third predetermined time.

As to a relationship with the first predetermined time and the second predetermined time, the third predetermined time is the time that is so short that a person approaching the image processing device may not check the identification information as described above, and therefore shorter than the first predetermined time and the second predetermined time.

Ninth Embodiment

A ninth embodiment stores display information as in the fifth embodiment. Then, the ninth embodiment sends the display information back to a PC when a device search is made from the PC within a second predetermined time after a motion sensor no longer detects a person. Further, in the ninth embodiment, when a device search is made from a PC within a fourth predetermined time after the motion sensor no longer detects the person, the display information is not sent back to the PC. The fourth predetermined time is shorter than the second predetermined time.

In the ninth embodiment, the network configuration, and the functional configuration and the hardware configuration of image processing devices are the same as those in the first embodiment and the description thereof will be omitted. A procedure for performing an operation according to the ninth embodiment will be described. The operation according to the ninth embodiment is implemented by the control unit 205 executing a program written in accordance with the following procedure.

Figure 18:
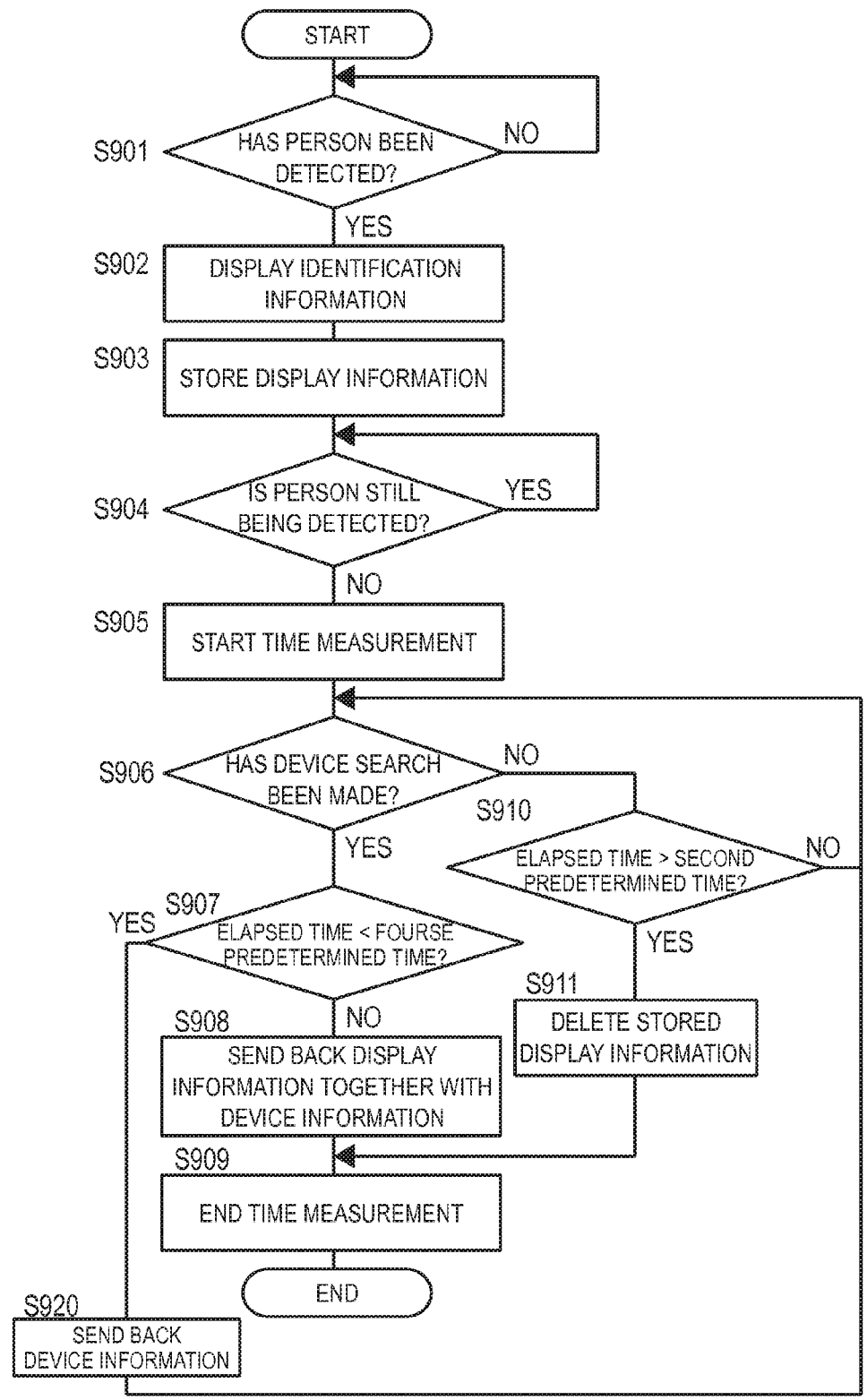
FIG. 18 is a flowchart illustrating a procedure according to a ninth embodiment.

FIG. 18 is a flowchart illustrating a procedure according to the ninth embodiment.

First, the control unit 205 determines whether or not the motion sensor 110 has detected a person (S901). When the motion sensor 110 has not detected a person (S901: NO), the control unit 205 waits in a standby state. On the other hand, when the motion sensor 110 has detected a person (S901: YES), the control unit 205 retrieves identification information from the storage unit 203, sends the identification information to the display unit 202 to cause the display unit 202 to display the identification information (S902). This causes the display unit 202 to display a screen including the identification information on the display panel 120. The display unit 202 may display all pieces of identification information that can be displayed as the identification information. Alternatively, the display unit 202 may display only predetermined one or some pieces of identification information.

The control unit 205 then stores the display information in the storage unit 203 (S903). Note that the information is stored on the flash ROM 321 or the HDD 323 which makes up the storage unit 203, or on the memory 314.

The control unit 205 then determines whether or not the motion sensor 110 is still detecting the person (S904). If the motion sensor 110 is still detecting the person (S904: YES), the control unit 205 waits in a standby state.

On the other hand, if the motion sensor 110 no longer detects the person (S904: NO), the control unit 205 starts time measurement (S905).

The control unit 205 then determines whether or not a device search has been made from the PC 150, for example (S906). If a device search has been made (S906: YES), the control unit 205 checks the elapsed time at the present time to determine whether or not the time that has elapsed since the motion sensor no longer detected the person is less than the fourth predetermined time (S907).

The fourth predetermined time is the time, for example, required for a person who left the image processing device 101 to return to the PC 150. The fourth predetermine time may be set by a user to any value and the time required to return from the image processing device 101 to the PC 150 may be determined by experiment or on the basis of experience, for example.

At S907, if the elapsed time is less than the fourth predetermined time (S907: YES), the control unit 205 sends only the device information of the image processing device 101 back to the PC 150 that has made the device search (S920). This is because the PC that has made the device search is likely to be different from the PC 150 of the person (user) who has caused the identification information to be displayed. Then the control unit 205 returns to S906 and proceeds with the rest of the process.

At S907, if the elapsed time is not less than the fourth predetermined time (S907: NO), the control unit 205 retrieves the display information from the storage unit 203 and sends the display information back to the PC 150 that has made the device search together with the device information (S908). Then, the control unit 205 ends time measurement (S909) and ends the process.

At S906, if a device search has not been made (S906: NO), the control unit 205 determines whether or not the second predetermined time has elapsed since the display of the identification information (S910). If the second predetermined time has not elapsed (S910: NO), the control unit 205 returns to S906. If the second predetermined time has elapsed (S910: YES), the control unit 205 deletes the stored display information from the storage unit 203 (S911). Then the control unit 205 ends time measurement (S909) and ends the process.

When displaying a result of a device search in a list, the PC 150 which has received the display information can, for example, highlight the identification information of the image processing device that has sent back the display information or can display the identification information at the top of the list. An exemplary display is substantially the same as the example described in the fourth embodiment illustrated in FIG. 12. In the ninth embodiment, in addition to sorting the list, the PC 150 may highlight or display the character in a different color. Further, as in the third embodiment, the PC 150 may highlight a different portion of the unique name or the IP address of the image processing device that has sent back the display information. If the process for extracting the different portion is performed on the image processing device, the process may be the same as the process in the third embodiment. If the process for extracting the different portion is performed on the PC, the process is the same as described in the fourth embodiment.

According to the ninth embodiment, since identification information is displayed simply by approaching the image processing device, the user can know the identification information of the image processing device without performing any particular operation, as in the first embodiment. In addition, display information is sent back in response to a device search made from the PC together with device information. This allows the PC to display the image processing device that has displayed the identification information in a readily identifiable manner to the user. Further, in the ninth embodiment, when the time elapsed after the motion sensor no longer detected the person is less than the fourth predetermined time, the display information is not sent back to the PC that has made the device search. Accordingly, for example, when the time elapsed after the motion sensor no longer detected the person is less than the fourth predetermine time, it is determined that the person is unlikely to have returned to the PC. In other words, if a device search is made from a PC when the time elapsed is less than the fourth predetermined time, the person who has made the device search is likely to different from the person who has approached the image processing device. In the ninth embodiment, when such a person who has not approached the image processing device has made a device search, display information is not sent back. This can prevent a modification to the list of the result of a device search or the like on the PC of a person who has not approached the image processing device.

Further, in the ninth embodiment, the stored display information is deleted after the lapse of the second predetermined time since the display of the identification information. Accordingly, the display information is not sent back to the PC in response to a device search made after the lapse of the time. The second predetermined time in the ninth embodiment is the same as the second predetermined time in the fifth embodiment.

Note that the ninth embodiment can be performed in conjunction with the fifth embodiment described previously to avoid sending display information back to a PC when a device search is made from the PC within the fourth predetermined time after the motion sensor no longer detected the person.

The ninth embodiment can be performed in conjunction with the sixth embodiment described previously to avoid sending back the identification information display starting time back to a PC when a device search made is made from the PC within the fourth predetermined time after the motion sensor no longer detected the person. Further, the ninth embodiment can be performed in conjunction with the seventh embodiment described previously to avoid sending the non-detected time back to a PC when a device search is made from the PC within the fourth predetermined time after the motion sensor no longer detected the person. Moreover, the ninth embodiment can be combined with the eighth embodiment described previously. By combining the ninth embodiment with the eighth embodiment, items of information such as display information (the fourth and fifth embodiments), the identification information display starting time (the sixth embodiment), and the non-detected time (the seventh embodiment) can be sent back by taking into consideration both of the time required for a person to check identification information and the time required for the person to return to his/her PC.

As to a relationship with the first predetermined time and the second predetermined time, the fourth predetermined time is the time required for a person who left the image processing device to return to the PC as described previously and therefore shorter than the first predetermined time and the second predetermined time. As to a relationship with the third predetermined time, which of the third predetermined time and fourth predetermined time is shorter depends on the distance between the image processing device and the PC. This is because if the distance between the image processing device and the PC is short, the third predetermined time required for checking identification information can be longer.

Tenth Embodiment

Display panels (display devices) provided in the image processing devices have different sizes depending on models of the image processing devices. In a tenth embodiment, a distance at which the motion sensor detects a person (a distance between an image processing device and a person) is changed in accordance with the size of a display panel so that a user can readily check identification information. Specifically, in the tenth embodiment, the larger the display panel is, the longer the distance between the image processing device and a person, at which the motion sensor detects the person, is set to. This allows the person to readily recognize the identification information when the image processing device displays the identification information. Note that the procedure for displaying identification information is the same as the procedure in any of the first to ninth embodiments described above or in any combination of the embodiments and therefore the description thereof will be omitted. Only display of identification information on a display panel will be described here.

Figure 19:
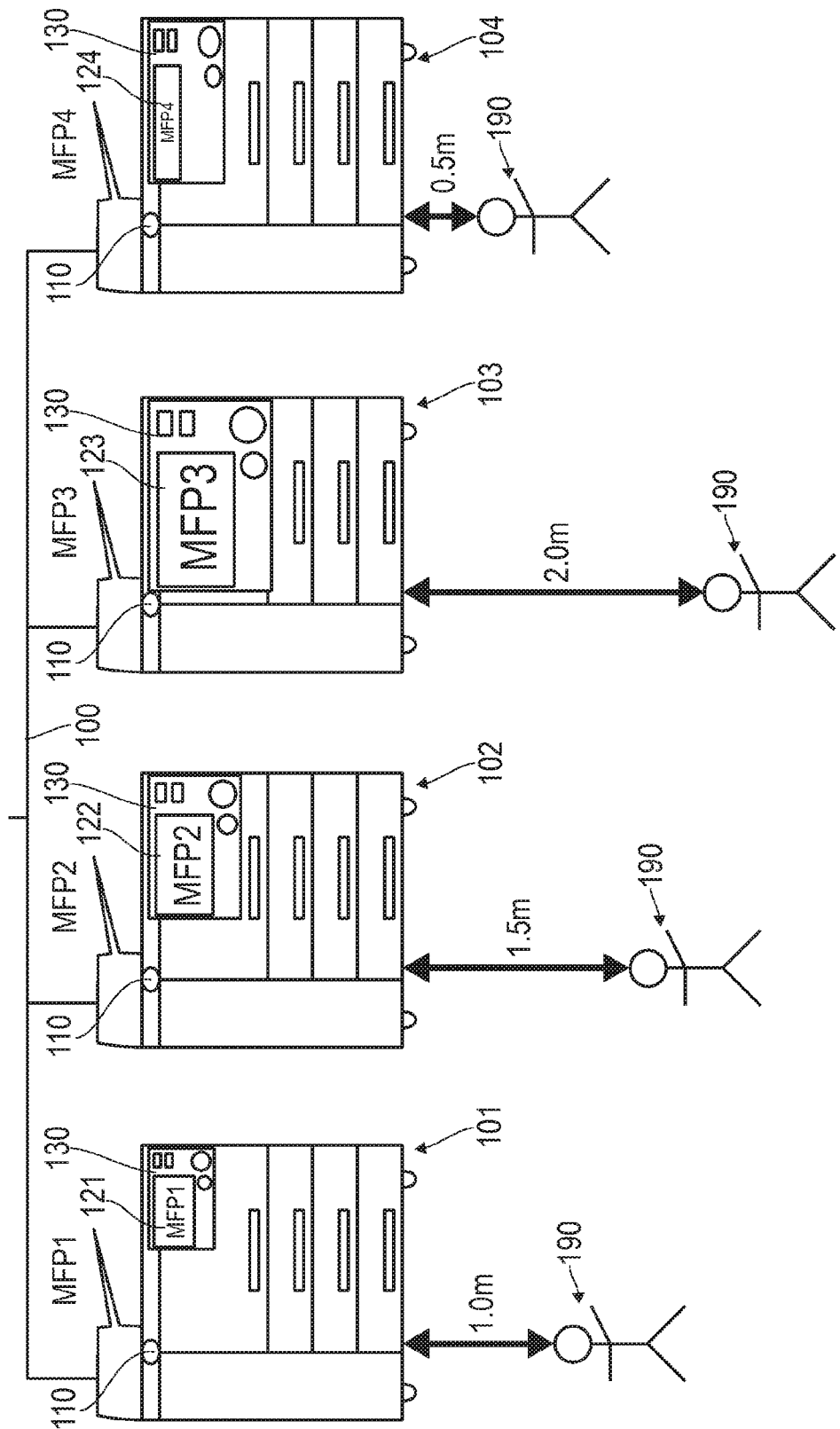
FIG. 19 is a diagram illustrating examples of character sizes of identification information displayed on each of display panels of different sizes and the distance between each of image processing devices and a person.

FIG. 19 is a diagram illustrating examples of character sizes of identification information displayed on each of display panels of different sizes and the distance between each of the image processing devices and a person. In the tenth embodiment, the network configuration, and the functional configuration and the hardware configuration of image processing devices are the same as those in the first embodiment, except for the sizes of display panels, and therefore the description thereof will be omitted. PCs 150, 151 and so forth that are connected to the network 100 are omitted from FIG. 19.

As illustrated in FIG. 19, image processing devices 101 to 104 are equipped with display panels of different sizes. The display panel 121 of the image processing device 101 (with a unique name, "MFP1") is a 5-inch panel. The display panel 122 of the image processing device 102 (with a unique name, "MFP2") is a 7-inch panel. The display panel 123 of the image processing device 103 (with a unique name, "MFP3") is a 9-inch panel. The display panel 124 of the image processing device 104 (with a unique name, "MFP4") is a character display panel.

The sizes of maximum character that can be displayed on display panels are different from each other, when the display panels have different sizes, like the display panels 121 to 124. Accordingly, when the identification information is displayed with the maximum character, the distance at which a person can recognize the displayed characters varies.

In the tenth embodiment, the timing of displaying identification information based on the distance to an approaching person is changed in accordance with the size of the display panel.

The 5-inch panel (the display panel 121 of MFP1) displays identification information when a person 190 reaches a distance of 1.0 meters from MFP1.

The 7-inch panel (the display panel 122 of MFP2) displays identification information when a person 190 reaches a distance of 1.5 meters from MFP2.

The 9-inch panel (the display panel 123 of MFP3) displays identification information when a person 190 reaches a distance of 2.0 meters from MFP3.

The character display panel (the display panel 124 of MFP4) displays identification information when a person 190 reaches a distance of 0.5 meters from MFP4.

As to the distance at which the motion sensor detects a person (the distance between an image processing device and a person), the distance at which the motion sensor 110 itself can detect may be changed in accordance with the size of the display panel. In the case of the motion sensor that is capable of detecting the distance to a person, the distance that triggers output of a signal indicating that the motion sensor has detected a person to the control unit 205 may be changed in accordance with the size of the display panel.

According to the tenth embodiment, a larger display panel can display larger characters and therefore a longer distance at which the motion sensor detects a person is set for a larger display panel. On the other hand, maximum characters displayed on a small display panel are smaller than characters displayed on a large display panel and therefore a shorter distance at which the motion sensor detects a person is set for a smaller display panel. Accordingly, if the display panel is large, identification information on the display panel can be checked earlier from a long distance at which a person may recognize characters; on the other hand, if the display panel is small, the waste of displaying identification information on the display panel from a long distance at which a person may not recognize characters can be eliminated.

Eleventh Embodiment

If the amount of identification information displayed on a display panel is large, characters on the limited space of the display panel need to be small. On the other hand, small characters are illegible from a long distance.

In an eleventh embodiment, therefore, when identification information is displayed on the display panel of an image processing device, the amount of information to be displayed and a distance at which the motion sensor detects a person are optimized. Note that the procedure for displaying identification information is the same as the procedure in any of the first to ninth embodiments described above or in any combination of the embodiments and therefore the description thereof will be omitted. Only display of identification information on a display panel will be described here.

Figure 20:
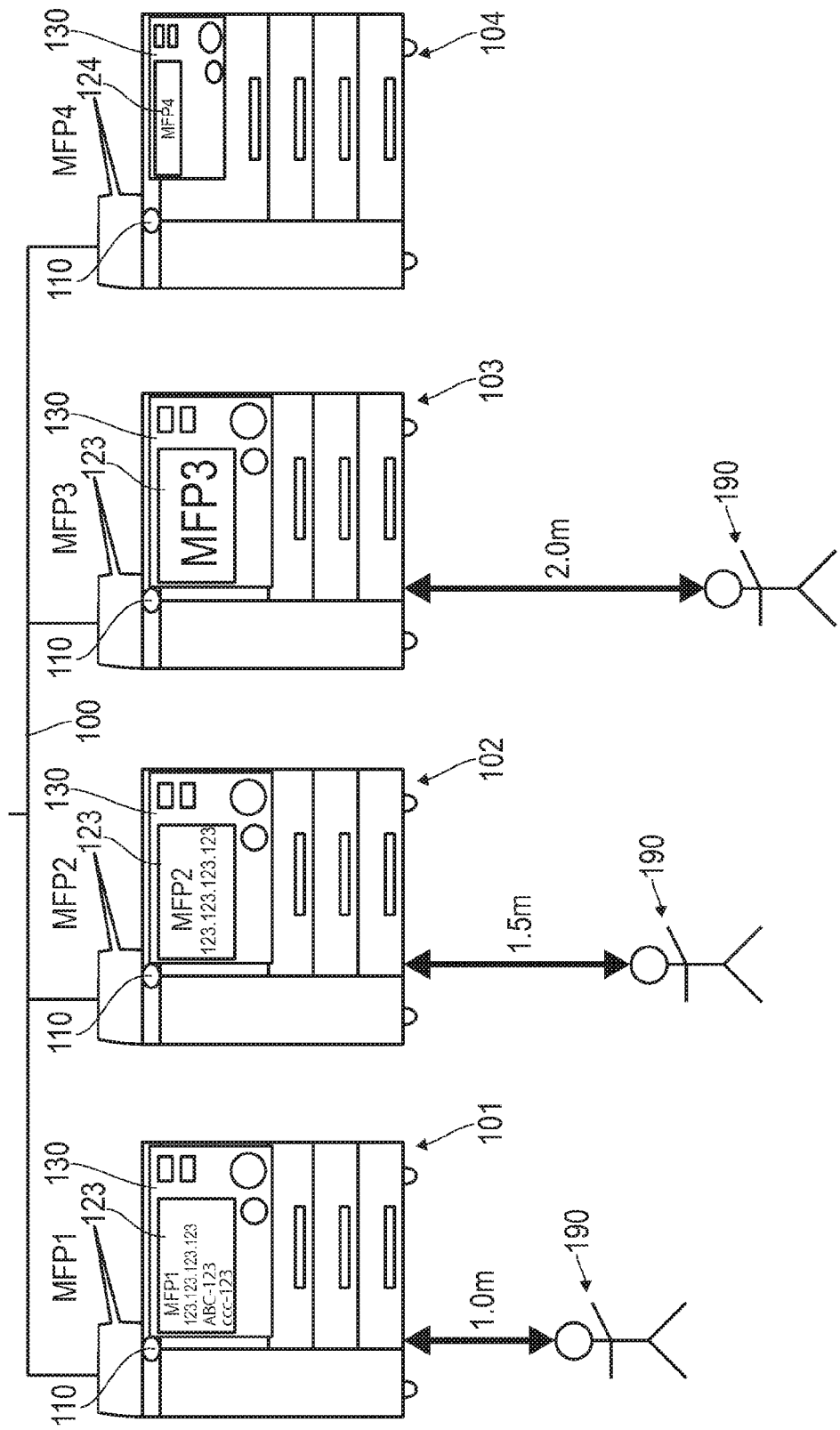
FIG. 20 is a diagram illustrating examples of character sizes of identification information displayed on each of display panels and the distance between each of image processing devices and a person.

FIG. 20 is a diagram illustrating examples of character sizes of identification information displayed on each of display panels and the distance between each of the image processing devices and a person. In the eleventh embodiment, the network configuration, and the functional configuration and the hardware configuration of image processing devices are the same as those in the first embodiment and therefore the description thereof will be omitted. PCs 150, 151 and so forth that are connected to the network 100 are omitted from FIG. 20.

In the eleventh embodiment, it is assumed for example that each of the MFP1 to MFP3 is equipped with a 9-inch display panel 123.

On MFP1, four items of information are displayed. When the amount of information to be displayed is large like this, a character size of 18 points is used. When a person 190 reaches a distance of 1.0 meters from MFP1, information is displayed.

On MFP2, two items of information are displayed. In such a case, a character size of 36 points is used. When a person 190 reaches a distance of 1.5 meters from MFP2, information is displayed.

On MFP3, one item of information is displayed. When the amount of information to be displayed is small like this, a character size of 72 points is used. When a person 190 reaches a distance of 2.0 meters from MFP3, information is displayed.

In this way, the timing of displaying information based on the distance to an approaching person is changed in accordance with the items of information to be displayed (i.e. the amount of information to be displayed). Accordingly, the information can be displayed at a position where the person can recognize the characters. To change the timing of displaying information in accordance with the amount of information to be displayed in this way, the distance at which the motion sensor detects a person may be changed in accordance with the amount of information to be displayed. In the case of the motion sensor that is capable of detecting the distance to a person, the distance that triggers output of a signal indicating that the motion sensor has detected a person to the control unit 205 may be changed in accordance with the amount of information to be displayed.

In this way, the items of information to be displayed are determined beforehand and when a person reaches a distance that corresponds to the items of information, the information may be displayed. In addition, for example, the items of information to be displayed (the amount of information to be displayed) may be changed in accordance with the distance between the image processing device and the person. Examples are given below.

When a person reaches a distance of 2.0 meters, one item is displayed with a character size of 72 points (MFP3 in FIG. 20).

When a person reaches a distance of 1.5 meters, two items are displayed with a character size of 36 points (MFP2 in FIG. 20).

When a person reaches a distance of 1.0 meters, four items are displayed with a character size of 18 points (MFP1 in FIG. 20).

In this way, the items of information to be displayed may be changed in accordance with the distance between an image processing device and a person approaching the image processing device. To accomplish this, a motion sensor that is capable of detecting the distance to a person is used. Then, the items of information to be displayed may be changed in accordance with the distance between the image processing device and the person.

According to the eleventh embodiment, when a large amount of identification information is displayed, a short distance at which the motion sensor detects a person is set; when a small amount of identification information is displayed, the long distance at which the motion sensor detects a person is set. In addition, when the motion sensor detects a person at a short distance, a large amount of identification information is displayed; when the motion sensor detects a person at a long distance, a small amount of identification information is displayed. In this way, identification information can be displayed with a readily legible character size in accordance with the distance between the image processing device and a person.

Twelfth Embodiment

A twelfth embodiment differs from the first embodiment in system configuration.

Figure 21:
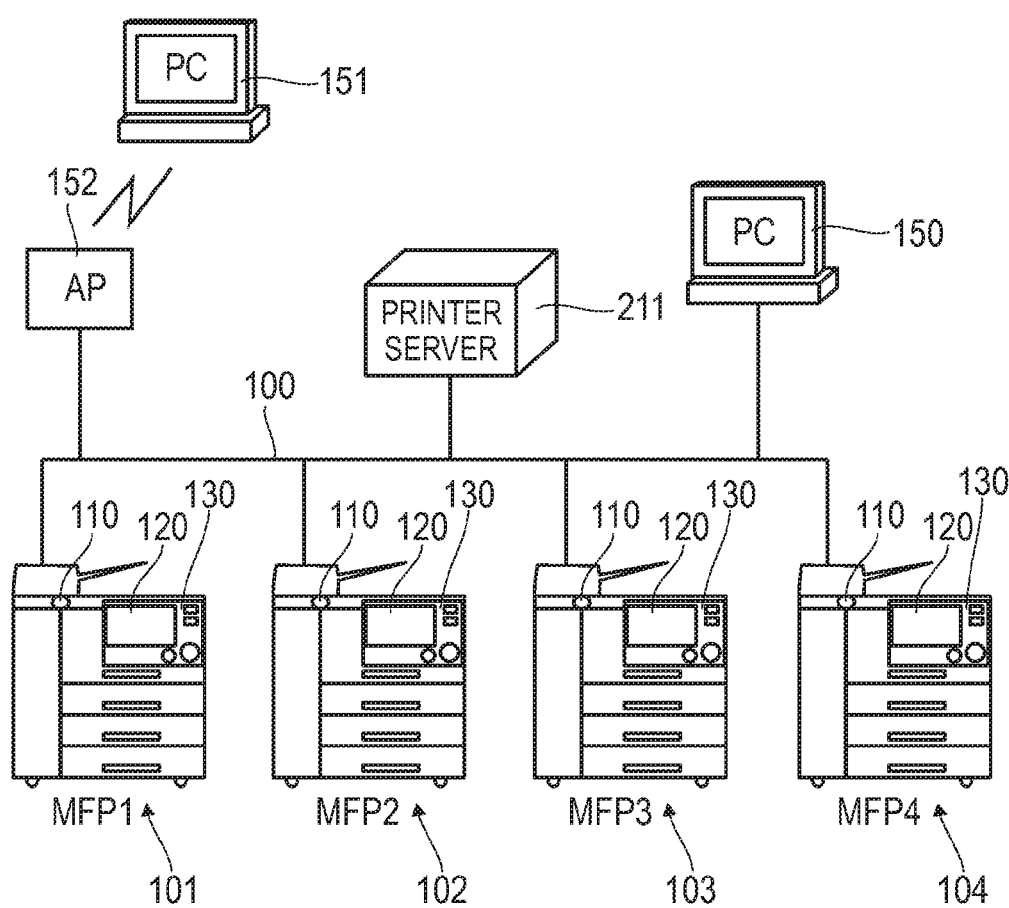
FIG. 21 is a block diagram illustrating an example of a system for image forming according to a twelfth embodiment.

FIG. 21 is a block diagram illustrating an example of a system for image forming according to the twelfth embodiment.

In the system according to the twelfth embodiment, a plurality of image processing devices 101 to 104 are connected to a network 100, as illustrated in FIG. 21. A plurality of PCs 150, 151 and so forth are also connected to the network 100. The PC 150 is connected through a cable, for example. The PC 151 is wirelessly connected through an access point 152, for example. A printer server 211 is connected to the network 100.

When printing is performed from the PC 150 or 151 in this system, an image processing device is selected on the user's PC 150 or 151.

A device selection command and a print job are sent from the PC 150 or 151 to the printer server 211 first. Then, the printer server 211 passes the print job to the image processing device specified by the device selection command from the PC 150 or 151 and printing is performed.

In the twelfth embodiment, the processes according to the procedures in the first to eleventh embodiments described previously can be performed to accomplish the operations described in the embodiments.

When the processes according to the procedures in the first to eleventh embodiments are performed by the printer server 211, the printer server 211 executes the procedures described previously. In this case, in response to detection of the person approaching an image processing device by the motion sensor 110, a signal from the motion sensor 110 is provided to the printer server 211 through each of the image processing devices 101 to 104. The printer server 211 receives the signal and instructs the image processing device that the person approached to cause a display unit provided in the image processing device to display identification information, assigned to the image processing device that the person approached, for distinguishing the image processing device from other image processing devices.

The identification information may be stored in the storage unit 203 of each of the image processing devices 101 to 104, for example. In this case, the printer server 211 causes the image processing device (any of the image processing devices 101 to 104) on which the identification information is to be displayed to retrieve the identification information from the storage unit 203 and display.

Alternatively, the identification information may be stored in a storage device such as a memory, a flash ROM, or a hard disk in the printer server 211 in association with the image processing devices. In this case, the printer server 211 sends, an image processing device on which the identification information is to be displayed (any of the image processing devices 101 to 104), the identification information of the image processing device and causes the image processing device to display the identification information.

The printer server 211 may compare the identification information of an image processing device that the person approached with the identification information of the other image processing devices and may extract a different portion of the identification information of the image processing device that the person approached. The printer server 211 may instruct the image processing device that the person approached to display the identification information with the different portion being highlighted. If the different portion is extracted on the printer server 211, the image processing device that the person approached may be set as the own device and the other image processing devices may be set as the other devices in the procedure described in the third embodiment (FIG. 8 or 9) and the process may be performed. The process for extracting a different portion may be performed on the image processing device as in the third embodiment.

Items of information in the other embodiments, i.e. display information, the identification information display starting time, the non-detected time and the like may be stored in the storage unit 203 of each of the image processing devices 101 to 104 or a storage device in the printer server 211.

According to the twelfth embodiment, the printer server 211 which manages a plurality of image processing devices connected to the network executes procedures according to the first to eleventh embodiments. This can achieve the same advantageous effects as the advantageous effects of the embodiments without installing programs for executing the procedures of the embodiments in each of the image processing devices.

While embodiments of the present invention have been described above, the present invention is not limited to the embodiments. In particular, the present invention can be carried out by combining any of the procedures described in the embodiments in various ways.

In the embodiments described above, A motion sensor is provided on each of a plurality of image processing devices and each of image processing device detects a person who approaches the image processing device. The present invention is not limited to this; at least one motion sensor may be provided in a room where a plurality of image processing devices are installed and the motion sensor may detects a person who approaches any of the image processing devices. In this case, the motion sensor provides a signal to an image processing device that a person approached, or the printer server.

While PCs have been taken as an example of terminal devices that use image processing devices in the embodiments, the terminal devices may be any of various devices such as mobile phones, smartphones, and tablets.

Further, any display may be presented on the display panel before the image processing device detects a person. If identification information is displayed initially, for example if identification information is displayed with a reduced size in an operation screen, the present invention can be applied to enlarge the identification information in response to detection of a person by the image processing device. In addition, the identification information may be highlighted so that the identification information of the image processing device can be readily distinguished from identification information of the other image processing devices.

Further, the present invention is a computer program product embodied in computer usable non-transitory medium having a computer readable program code embedded therein for controlling an image processing device to execute a process.

The present invention is defined by the claims and various variations of the present invention are possible.

What is claimed is:

1. An image processing device which performs image processing of an image from a terminal device in response to a specifying operation by a user performed at the terminal device, the image processing device comprising:
   a motion sensor which detects a person;
   a display unit which displays information on a screen;
   a function unit comprising a printer; and
   a control unit which causes the display unit to display, in response to detection of the person by the motion sensor, a screen including identification information used for the specifying operation by the user to have the image from the terminal device processed and that distinguishes the image processing device from other image processing devices, and the control unit causes the function unit to process and print the image in response to the specifying operation from the terminal device.

2. The image processing device according to claim 1, further comprising an operation panel which accepts an operation,
   wherein the control unit changes display from the screen including the identification information displayed on the display unit to an operation screen in response to an operation on the operation panel and blanks the screen including the identification information displayed on the display unit in response to the motion sensor no longer detecting the person.

3. The image processing device according to claim 1, wherein the control unit compares the identification information of own image processing device with identification information of the other image processing devices to extract a different portion of the identification information of the own image processing device, and causes the identification information to be displayed with the extracted different portion being highlighted.

4. The image processing device according to claim 1, wherein the larger a display device provided in the display unit is, the longer a distance at which the motion sensor detects the person is set to.

5. The image processing device according to claim 1, wherein
   when the motion sensor detects the person at a short distance, the control unit displays a large amount of the identification information, and
   when the motion sensor detects the person at a long distance, the control unit displays a small amount of the identification information.

6. An image processing device which performs image processing in response to a specifying operation by a user, the image processing device comprising:
   a motion sensor which detects a person;
   a display unit which displays information on a screen;
   a control unit which causes the display unit to display a screen including identification information used for the specifying operation by the user and for distinguishing the image processing device from other image processing devices in response to detection of the person by the motion sensor; and
   a storage unit,
   wherein the control unit stores information indicating that the image processing device has displayed the identification information in the storage unit and, when an image processing device search is made from a terminal device within a first predetermined time, sends the information indicating that the image processing device has displayed the identification information stored in the storage unit back to the terminal device.

7. The image processing device according to claim 6, wherein when duration of time the motion sensor is detecting the person is less than a third predetermined time, the control unit does not send the information indicating that the image processing device has displayed the identification information back to the terminal device.

8. The image processing device according to claim 6, wherein when the search is made from the terminal device within a fourth predetermined time after the motion sensor no longer detects the person, the control unit does not send the information indicating that the image processing device has displayed the identification information back to the terminal device.

9. An image processing device which performs image processing in response to a specifying operation by a user, the image processing device comprising:
   a motion sensor which detects a person;
   a display unit which displays information on a screen;
   a control unit which causes the display unit to display a screen including identification information used for the specifying operation by the user and for distinguishing the image processing device from other image processing devices in response to detection of the person by the motion sensor; and
   a storage unit,
   wherein the control unit stores information indicating that the image processing device has displayed the identification information in the storage unit and, when an image processing device search is made from a terminal device within a second predetermined time after the motion sensor no longer detects the person, sends the information indicating that the image processing device has displayed the identification information stored in the storage unit back to the terminal device.

10. An image processing device which performs image processing in response to a specifying operation by a user, the image processing device comprising:
    a motion sensor which detects a person;
    a display unit which displays information on a screen;
    a control unit which causes the display unit to display a screen including identification information used for the specifying operation by the user and for distinguishing the image processing device from other image processing devices in response to detection of the person by the motion sensor; and
    a storage unit,
    wherein the control unit stores time at which the image processing device has displayed the identification information in the storage unit and, when an image processing device search is made from a terminal device within a first predetermined time, sends the time at which the image processing device has displayed the identification information stored in the storage unit back to the terminal device.

11. The image processing device according to claim 10, wherein when duration of time the motion sensor is detecting the person is less than a third predetermined time, the control unit does not send the time at which the image processing device has displayed the identification information back to the terminal device.

12. The image processing device according to claim 10, wherein when the search is made from the terminal device within a fourth predetermined time after the motion sensor no longer detects the person, the control unit does not send the time at which the image processing device has displayed the identification information back to the terminal device.

13. An image processing device which performs image processing in response to a specifying operation by a user, the image processing device comprising:
    a motion sensor which detects a person;
    a display unit which displays information on a screen;
    a control unit which causes the display unit to display a screen including identification information used for the specifying operation by the user and for distinguishing the image processing device from other image processing devices in response to detection of the person by the motion sensor; and a storage unit,
wherein the control unit stores time at which the motion sensor no longer detected the person in the storage unit and, when an image processing device search is made from a terminal device within a second predetermined time, sends the time at which the motion sensor no longer detected the person stored in the storage unit back to the terminal device.

14. The image processing device according to claim 13, wherein when duration of time the motion sensor is detecting the person is less than a third predetermined time, the control unit does not send the time at which the motion sensor no longer detected the person back to the terminal device.

15. The image processing device according to claim 13, wherein when the search is made from the terminal device within a fourth predetermined time after the motion sensor no longer detects the person, the control unit does not send the time at which the motion sensor no longer detected the person back to the terminal device.

16. An image processing device which performs image processing in response to a specifying operation by a user, the image processing device comprising:
   a motion sensor which detects a person;
   a display unit which displays information on a screen; and
   a control unit which causes the display unit to display a screen including identification information used for the specifying operation by the user and for distinguishing the image processing device from other image processing devices in response to detection of the person by the motion sensor, wherein
   when a large amount of the identification information is displayed, the control unit sets a short distance at which the motion sensor detects the person, and
   when a small amount of the identification information is displayed, the control unit sets a long distance at which the motion sensor detects the person.

17. A computer program product comprising a computer usable non-transitory medium having a computer readable program code embedded therein for controlling an image processing device, the computer readable program code configured to cause the image processing device to execute a process on an image from a terminal device in response to a specifying operation by a user performed at the terminal device, the image processing device comprising a motion sensor which detects a person, a display unit which displays information on a screen, and a function unit comprising a printer, the process comprising:
   (a) determining whether or not the motion sensor has detected the person;
   (b) causing the display unit to display, in response to detection of the person by the motion sensor, identification information used for the specifying operation by the user to have the image from the terminal device processed and that distinguishes the image processing device from other image processing devices; and
   (c) causing the function unit to process and print the image in response to the specifying operation performed at the terminal device.

18. The computer program product according to claim 17, wherein the process further comprises:
   (d) comparing the identification information of own image processing device with identification information of the other image processing devices to extract a different portion of the identification information of the own image processing device,
   wherein at step (b), causing the identification information to be displayed with the extracted different portion being highlighted.

19. A computer program product comprising a computer usable non-transitory medium having a computer readable program code embedded therein for controlling an image processing device, the computer readable program code configured to cause the image processing device to execute a process, the image processing device comprising a motion sensor which detects a person and a display unit which displays information on a screen and, the process comprising:
   (a) determining whether or not the motion sensor has detected the person; and
   (b) causing the display unit to display identification information for distinguishing the image processing device from other image processing devices in response to detection of the person by the motion sensor;
   (c) storing information indicating that the image processing device has displayed the identification information in a storage unit; and
   (d) when an image processing device search is made from a terminal device on which one of a plurality of image processing devices is selected and used within a first predetermined time, sending the information indicating that the image processing device has displayed the identification information stored in the storage unit back to the terminal device.

20. A computer program product comprising a computer usable non-transitory medium having a computer readable program code embedded therein for controlling an image processing device, the computer readable program code configured to cause the image processing device to execute a process, the image processing device comprising a motion sensor which detects a person and a display unit which displays information on a screen and, the process comprising:
   (a) determining whether or not the motion sensor has detected the person; and
   (b) causing the display unit to display identification information for distinguishing the image processing device from other image processing devices in response to detection of the person by the motion sensor;
   (c) storing information indicating that the image processing device has displayed the identification information in a storage unit; and
   (d) when an image processing device search is made from a terminal device on which one of a plurality of image processing devices is selected and used within a second predetermined time after the motion sensor no longer detects the person, sending the information indicating that the image processing device has displayed the identification information stored in the storage unit back to the terminal device.

* * * * *